United States Patent
Inoue et al.

(10) Patent No.: US 9,522,661 B2
(45) Date of Patent: Dec. 20, 2016

(54) VEHICLE CONTROL APPARATUS AND VEHICLE CONTROL METHOD

(71) Applicant: TOYOTA JIDOSHA KABUSHIKI KAISHA, Toyota-shi, Aichi-ken (JP)

(72) Inventors: Go Inoue, Gotenba (JP); Yoshitaka Fujita, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/613,671

(22) Filed: Feb. 4, 2015

(65) Prior Publication Data

US 2015/0239445 A1 Aug. 27, 2015

(30) Foreign Application Priority Data

Feb. 26, 2014 (JP) .................... 2014-035715

(51) Int. Cl.
*B60T 8/86* (2006.01)
*B60T 8/171* (2006.01)
*B60T 8/1761* (2006.01)
*B60T 7/22* (2006.01)

(52) U.S. Cl.
CPC .. *B60T 8/86* (2013.01); *B60T 7/22* (2013.01); *B60T 8/171* (2013.01); *B60T 8/17616* (2013.01); *B60T 2201/10* (2013.01); *B60T 2250/04* (2013.01)

(58) Field of Classification Search
None
See application file for complete search history.

(56) References Cited

U.S. PATENT DOCUMENTS

| 4,997,236 A | * | 3/1991 | Naito | ............... | B60T 8/17616 |
| | | | | | 303/184 |
| 5,024,285 A | * | 6/1991 | Fujita | ............... | B60T 8/175 |
| | | | | | 180/197 |
| 5,435,634 A | * | 7/1995 | Suto | ............... | B60T 8/17636 |
| | | | | | 303/113.4 |
| 2004/0036351 A1 | * | 2/2004 | Mayer | ............... | B60T 8/1705 |
| | | | | | 303/139 |
| 2005/0264099 A1 | * | 12/2005 | Kamiya | ............... | B60T 7/22 |
| | | | | | 303/15 |
| 2007/0225117 A1 | * | 9/2007 | Shimizu | ............... | B60T 7/12 |
| | | | | | 477/182 |

(Continued)

FOREIGN PATENT DOCUMENTS

| DE | 102004003886 A1 | 8/2005 |
| DE | 102010030483 A1 | 12/2011 |

(Continued)

*Primary Examiner* — Yonel Beaulieu
*Assistant Examiner* — Krishnan Ramesh
(74) *Attorney, Agent, or Firm* — Sughrue Mion, PLLC

(57) ABSTRACT

A vehicle control apparatus which performs a parking control of a vehicle, includes a wheel setting unit configured to set at least one brake wheel which is a wheel to which a braking force is applied during the parking control and at least one non-brake wheel which is a wheel to which the braking force is not applied during the parking control, and a control unit configured to perform the parking control of the vehicle based on a rotation amount of at least one brake wheel and a rotation amount of at least one non-brake wheel detected by a wheel speed sensor detecting the rotation amount of a wheel of the vehicle.

19 Claims, 17 Drawing Sheets

(56) References Cited

U.S. PATENT DOCUMENTS

| | | | | |
|---|---|---|---|---|
| 2008/0262687 | A1* | 10/2008 | Fujita | B60T 7/12 701/70 |
| 2009/0234526 | A1* | 9/2009 | Taki | B60T 7/22 701/23 |
| 2009/0236157 | A1* | 9/2009 | Akamatsu | B60K 7/0007 180/55 |
| 2011/0292079 | A1* | 12/2011 | Hosoi | B62D 15/0275 345/632 |
| 2012/0041661 | A1* | 2/2012 | Kaneko | B60T 1/062 701/70 |
| 2013/0060421 | A1* | 3/2013 | Kadowaki | B60R 1/00 701/36 |
| 2013/0063601 | A1* | 3/2013 | Wakabayashi | B60R 1/00 348/148 |
| 2013/0147945 | A1* | 6/2013 | Watanabe | H04N 7/18 348/118 |
| 2014/0032073 | A1* | 1/2014 | Hasegawa | B60T 1/005 701/70 |
| 2014/0032074 | A1* | 1/2014 | Hasegawa | B60T 1/005 701/70 |
| 2014/0244070 | A1* | 8/2014 | Inagaki | B62D 15/0285 701/1 |
| 2015/0040558 | A1* | 2/2015 | Endo | B60T 13/241 60/591 |
| 2015/0094925 | A1* | 4/2015 | Senoo | B60T 1/005 701/70 |

FOREIGN PATENT DOCUMENTS

| | | |
|---|---|---|
| EP | 2263903 A1 | 12/2010 |
| GB | 2481888 A | 1/2012 |
| JP | 64-32955 A | 2/1989 |
| JP | 2003-534976 A | 11/2003 |
| JP | 2006-103517 A | 4/2006 |
| JP | 2008-143337 A | 6/2008 |
| JP | 2012-6504 A | 1/2012 |
| JP | 2014-35715 A | 2/2014 |

* cited by examiner

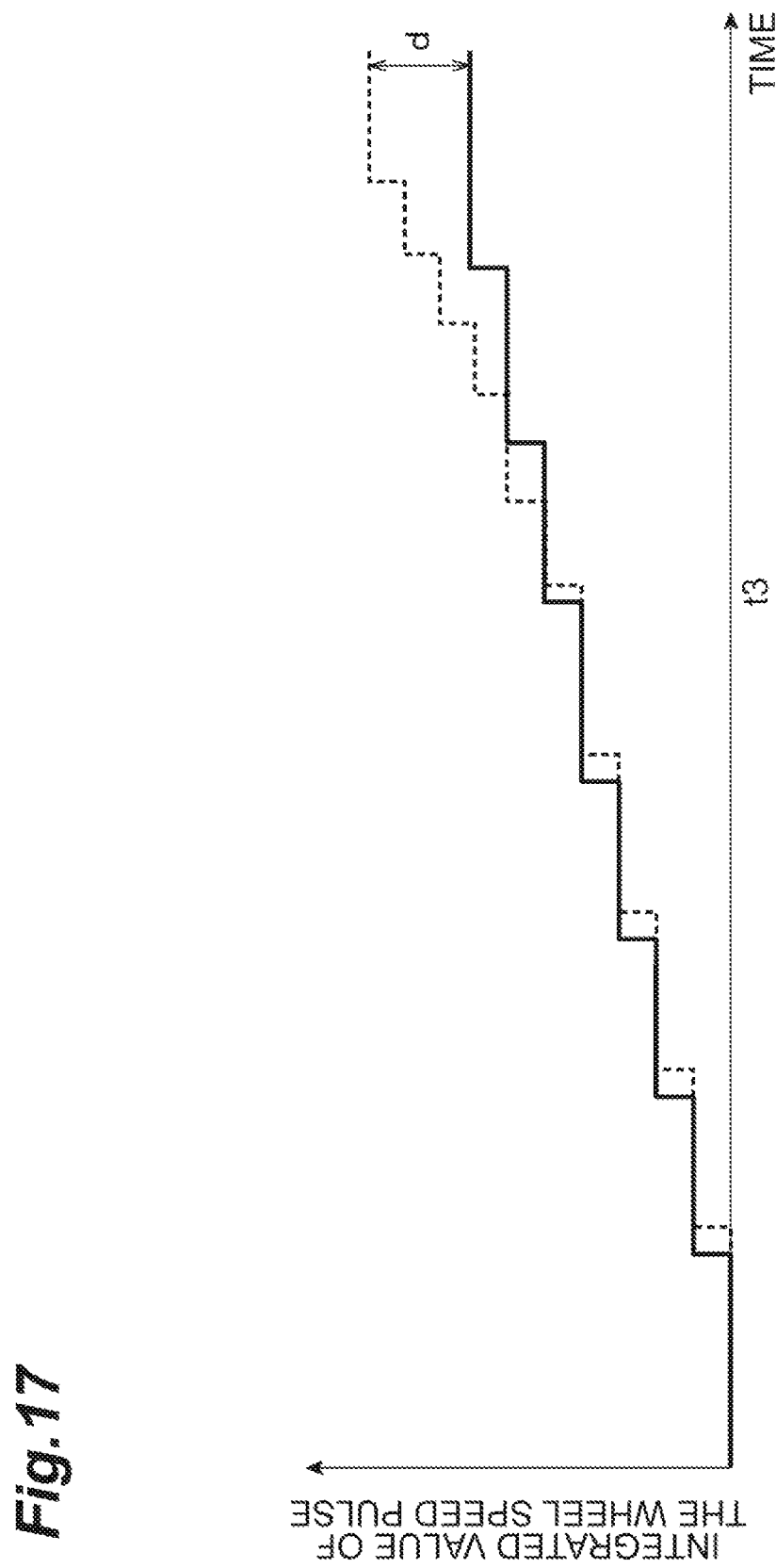

VEHICLE CONTROL APPARATUS AND VEHICLE CONTROL METHOD

CROSS-REFERENCE TO RELATED APPLICATION

This application claims priority to Japanese Application No. 2014-035715, filed Feb. 26, 2014, the disclosure of which is hereby incorporated by reference in their entirety.

BACKGROUND OF THE INVENTION

Field of the Invention

The present invention relates to a vehicle control apparatus and a vehicle control method.

Related Background Art

An automatic parking control apparatus which performs an automatic parking control is known (for example, refer to Japanese Unexamined Patent Application Publication No. 2008-143337). In the apparatus disclosed in Japanese Unexamined Patent Application Publication No. 2008-143337, the automatic parking control is performed using a detected value of a wheel speed sensor. As the detected value of the wheel speed sensor, a wheel speed pulse is exemplified. In addition, Japanese Unexamined Patent Application Publication Nos. 2003-534976 and 64-032955 are examples of the related art.

SUMMARY OF INVENTION

When a wheel speed pulse is detected, a vehicle speed (wheel speed) is calculated using a period of a wheel speed pulse, and the calculated vehicle speed may be used in an automatic parking control of a vehicle.

Incidentally, the period of the wheel speed pulse is long as the vehicle speed is decreased. Meanwhile, in a state where a wheel is not rotated and slides on a road surface (a lock state), the wheel speed pulse is not generated. Accordingly, it may be difficult to determine whether the period of the wheel speed pulse is long since the vehicle speed is decreased or the period of the wheel speed pulse is long since the wheel is locked, as the vehicle speed is decreased. In this way, in the apparatus using the period of the wheel speed pulse, the automatic parking control may not be performed with sufficiently high accuracy. Accordingly, the present invention provides a vehicle control apparatus and a vehicle control method capable of performing an appropriate parking control.

A vehicle control apparatus according to an aspect of the present invention is an apparatus that performs a parking control of a vehicle. The apparatus includes a wheel setting unit and a control unit. The wheel setting unit sets at least one brake wheel which is a wheel to which a braking force is applied during the parking control and at least one non-brake wheel which is a wheel to which the braking force is not applied during the parking control. The control unit performs the parking control of the vehicle based on a rotation amount of at least one brake wheel and a rotation amount of at least one non-brake wheel detected by a wheel speed sensor detecting the rotation amount of a wheel of the vehicle. According to the aspect, it is possible to perform an appropriate parking control.

In the aspect, the control unit may estimate a moving state amount of the vehicle based on the rotation amount of at least one non-brake wheel, and may control at least one brake wheel using the moving state amount of the vehicle. Accordingly, it is possible to perform an appropriate parking control using the moving state amount of the vehicle of improved accuracy.

In the aspect, the moving state amount of the vehicle may be a movement distance, a speed, an acceleration, or a differential value of the acceleration of the vehicle.

In the aspect, the control unit may determine whether or not the brake wheel is locked based on a difference between the rotation amount of one brake wheel and the rotation amount of at least one non-brake wheel. According to this configuration, it is possible to accurately determine whether or not the brake wheel is locked.

In the aspect, when at least one brake wheel is locked, the wheel setting unit may reset at least one non-brake wheel to the brake wheel. According to this configuration, when the brake wheel is locked, the non-brake wheel is reset to the brake wheel, and it is possible to apply the braking force to the brake wheel.

In the aspect, when at least one brake wheel is locked, the control unit may cause a brake actuator to decrease a braking force with respect to one locked brake wheel or a plurality of locked brake wheels, and may cause the brake actuator to apply the braking force to the one reset brake wheel or the plurality of reset brake wheels. According to this configuration, it is possible to decrease a variation of the braking force of the entire vehicle.

In the aspect, the control unit may cause the brake actuator to apply the braking force to the one reset brake wheel or the plurality of reset brake wheels at a force corresponding to the braking force decreased with respect to the one locked brake wheel or the plurality of locked brake wheels. According to this configuration, it is possible to compensate for the decreased braking force by the reset brake wheel.

In the aspect, the wheel setting unit may set at least two non-brake wheels, the control unit may determine whether or not the brake wheel is locked based on the difference between the rotation amount of one brake wheel and the rotation amount of at least one non-brake wheel, and when the brake wheel is locked, the wheel setting unit may set at least one non-brake wheel other than the non-brake wheel, which is used to determine whether or not the brake wheel is locked, to the brake wheel. According to this configuration, even when the non-brake wheel is reset to the brake wheel and the variation of the braking force in the entire vehicle is decreased, it is possible to accurately understand a movement of the vehicle using the remaining non-brake wheel.

In the aspect, the non-brake wheel may be a wheel to which the braking force and a driving force are not applied during the parking control. According to this configuration, it is possible to determine not only the locked state of the brake wheel but also a slip state in which the brake wheel slips.

A vehicle control method according to another aspect of the present invention is a method performing a parking control of a vehicle. The method includes a set step, a detection step, a determination step, and a control step. In the set step, at least one brake wheel which is a wheel to which a braking force is applied during the parking control and at least one non-brake wheel which is a wheel to which the braking force is not applied during the parking control are set. In the detection step, a rotation amount of at least one brake wheel and a rotation amount of at least one non-brake wheel are detected using a wheel speed sensor. In the determination step, whether or not the brake wheel is locked is determined based on the rotation amount of at least one brake wheel and the rotation amount of at least one non-brake wheel detected in the detection step. In the control step, a predetermined braking force is applied to the brake wheel when it is determined that the brake wheel is not locked in the determination step, and a braking force smaller than the predetermined braking force is applied to the brake wheel when it is determined that the brake wheel is locked in the determination step. According to the aspect, it is possible to perform an appropriate parking control.

As described above, according to various aspects of the present invention, it is possible to appropriately perform a parking control.

BRIEF DESCRIPTION OF THE DRAWINGS

FIG. 17 is a result showing the integrated value of the wheel speed pulse of the brake wheel and the non-brake wheel when the wheel slips.

DESCRIPTION OF THE PREFERRED EMBODIMENTS

Figure 1:
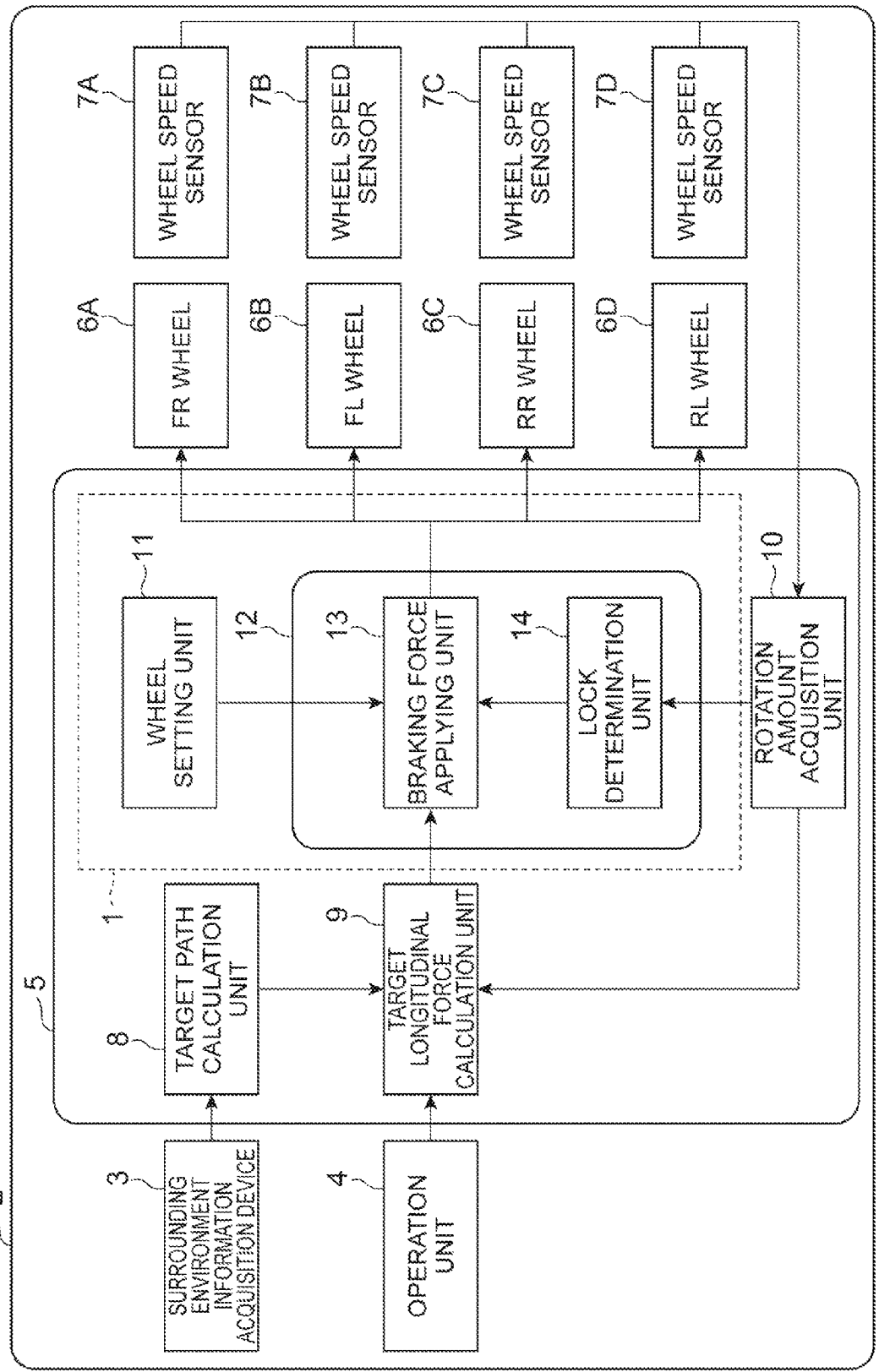
FIG. 1 is a block diagram showing a configuration of a vehicle including a vehicle control apparatus according to an embodiment.

Hereinafter, various embodiments will be described in detail with reference to the drawings. In addition, in the drawings, the same reference numerals are assigned to the same portions or the corresponding portions.

First Embodiment

A vehicle control apparatus according to the present embodiment is an apparatus that performs a parking control. The parking control indicates a control for stopping a vehicle at a target parking position. The parking control includes an automatic parking control which controls the vehicle and automatically stops the vehicle at the parking position, a control which performs only assistance of the parking by notification or the like to a driver, and a control which causes the driver and vehicle equipment to cooperatively operate and assists the parking. Moreover, hereinafter, the case where the vehicle control apparatus performs the automatic parking control is described as an example. In addition, the parking control includes not only the control until the vehicle is parked at the target parking position but also a control which moves the vehicle to a static steering place or the like required for the parking.

The vehicle control apparatus performs a control which applies a braking force to at least a wheel in the parking control. In addition, if necessary, the vehicle control apparatus performs a control which applies a driving force to the wheel or a control of steering. Moreover, the parking control may be performed on the assumption that the vehicle is travelled at a low speed or the vehicle is stopped. For example, the low speed may be a speed of 2 km/h or less.

First, an outline of a configuration of a vehicle control apparatus 1 will be described. FIG. 1 is a block diagram showing a configuration of a vehicle 2 including the vehicle control apparatus 1 according to the present embodiment. For example, as shown in FIG. 1, the vehicle 2 includes a surrounding environment information acquisition device 3, an operation unit 4, and ECU 5. ECU 5 is a computer of an automobile device performing an electronic control, and is configured to include memory such as a processor (Central Processing Unit (CPU)), Read Only Memory (ROM), or Random Access Memory (RAM), an input-output interface, or the like.

Here, the vehicle 2 is a vehicle including 4 wheels. That is, the vehicle 2 include a FR wheel 6A, a FL wheel 6B, a RR wheel 6C, and a RL wheel 6D. The FR wheel 6A is a right front wheel of the vehicle 2. The FL wheel 6B is a left front wheel of the vehicle 2. The RR wheel 6C is a right rear wheel of the vehicle 2. The RL wheel 6D is a left rear wheel of the vehicle 2.

In the vehicle 2, a sensor for detecting a rotation amount of each wheel is provided. A wheel speed sensor 7A detects the rotation amount of the FR wheel 6A. A wheel speed sensor 7B detects the rotation amount of the FL wheel 6B. A wheel speed sensor 7C detects the rotation amount of the RR wheel 6C. A wheel speed sensor 7D detects the rotation amount of the RL wheel 6D. The wheel speed sensor 7A outputs a wheel speed pulse signal in proportion to the rotation amount (the number of revolutions of an axle per unit time) of the wheel. The number of wheel speed pulses per rotation of the wheel is set in advance. That is, the number of wheel speed pulses is correlation with the rotation amount of the wheel. The wheel speed sensor 7A outputs the wheel speed pulse signal to the ECU 5. The wheel speed sensors 7B to 7D are configured to be similar to the wheel speed sensor 7A.

The surrounding environment information acquisition device 3 acquires surrounding environment information which is surrounding information of the vehicle 2. The surrounding environment information is information including position information of the vehicle 2, position information of an object existing around the vehicle 2, classification information of the object, road information in a travelling direction of the vehicle 2, road surface information, white line information, traffic information, or the like. The position information of a parking section line defining the parking position may be included in the while line information. Moreover, a wall or the like defining the parking section may be included in the object existing around the vehicle 2. For example, as the surrounding environment information acquisition device 3, Global Positioning System (GPS) device, a camera, radar, or the like may be used. The GPS is a measurement system using a satellite, and is used for acquiring the position information of the vehicle 2. The surrounding environment information acquisition device 3 outputs the surrounding environment information to the ECU 5.

The operation unit 4 receives an operation of the driver for adjusting the braking force. For example, the operation unit 4 is a brake pedal. The braking force is a force which is applied to the wheel to decelerate the vehicle 2 in the longitudinal direction. The operation unit 4 outputs the signal according to the operation of the driver to the ECU 5.

For example, in addition to the vehicle control apparatus 1, the ECU 5 includes a target path calculation unit 8, a target longitudinal force calculation unit 9, and a rotation amount acquisition unit 10.

The target path calculation unit 8 calculates a target path of the vehicle 2. The target path is a travelling path until the target position. For example, the target position is a target parking position or an intermediate point set until the target position. For example, the target path calculation unit 8 may calculate a path from a current position of the vehicle 2 to the parking position based on the information output by the surrounding environment information acquisition device 3. In addition, when a navigation system is mounted on the vehicle 2, or when the vehicle 2 is configured to communication with the navigation system, the target path calculation unit 8 may acquire the target path of the vehicle 2 from the navigation system. The target path calculation unit 8 outputs the target path to the target longitudinal force calculation unit 9.

The rotation amount acquisition unit 10 is connected to the wheel speed sensors 7A to 7D, and acquires the rotation amount of each of the FR wheel 6A, the FL wheel 6B, the RR wheel 6C, and the RL wheel 6D. The rotation amount acquisition unit 10 may store the wheel speed pulse signals obtained from the wheel speed sensors 7A to 7D in time series. The rotation amount acquisition unit 10 outputs the wheel speed pulse signals to the target longitudinal force calculation unit 9 and the vehicle control apparatus 1.

The target longitudinal force calculation unit 9 calculates a target longitudinal force of the vehicle 2. The target longitudinal force is the longitudinal force which is the target of the vehicle 2. The longitudinal force is the force in the longitudinal direction which is applied to the wheels of the vehicle 2 to accelerate and decelerate the vehicle 2 in the longitudinal direction.

For example, the target longitudinal force calculation unit 9 calculates the target longitudinal force of the vehicle 2 using the surrounding environment information. For example, the target longitudinal force calculation unit 9 calculates the target longitudinal force of the vehicle 2 based on the position information of the vehicle 2, and the position information of the parking section line defining the parking position. Alternatively, for example, the target longitudinal force calculation unit 9 may calculate the target longitudinal force when the vehicle 2 travels on the target path for each travelling position based on the target path of the vehicle 2 output by the target path calculation unit 8. Alternatively, for example, the target longitudinal force calculation unit 9 may calculate the target longitudinal force when the vehicle 2 travels on the target path for each travelling position based on the target path of the vehicle 2 output by the target path calculation unit 8 or the rotation amount of each wheel acquired by the rotation amount acquisition unit 10. Alternatively, for example, the target longitudinal force calculation unit 9 may calculate the target longitudinal force based on the signal according to the operation of the driver output by the operation unit 4. For example, the target longitudinal force calculation unit 9 may calculate the target longitudinal force based the signal according to the operation of the brake pedal of the driver. Moreover, for example, the target longitudinal force calculation unit 9 may calculate the target longitudinal force based the signal according to the operation of an accelerator pedal of the driver. The target longitudinal force calculation unit 9 outputs the target longitudinal force to the vehicle control apparatus 1.

The vehicle control apparatus 1 is an apparatus which assists the parking of the vehicle 2. For example, the vehicle control apparatus 1 applies the driving force and the braking force to the wheels to park the vehicle at a target parking position based on the target path and the target longitudinal force. For example, the vehicle control apparatus 1 includes a wheel setting unit 11 and a control unit 12. For example, the control unit 12 includes a braking force applying unit 13 and a lock determination unit 14.

The wheel setting unit 11 sets at least one brake wheel which is a wheel to which the braking force is applied during the parking control and at least one non-brake wheel which is a wheel to which the braking force is not applied during the parking control from the wheels included in the vehicle 2. For example, the wheel setting unit 11 may set the brake wheel and the non-brake wheel based on the instruction information of the driver or the like, and may set the brake wheel and the non-brake wheel based on the surrounding environment information or results of the control in the vehicle 2. Here, "during the parking control" means the middle of the control assisting a process until the vehicle 2 is parked to the target parking position. For example, the assist control includes an automatic drive control, a notification control, or a cooperative control with the driver. During the parking control, the vehicle 2 is travelled at a low speed (for example, 2 km/h or less).

The brake wheel is the wheel to which the braking force is applied by a brake actuator (not shown) during the parking control. That is, the brake wheel is the wheel which becomes an object to which the braking force is applied during the parking control. The braking force is applied by a brake mechanism (not shown) described below and the braking force applying unit 13 described below. On the other hand, the non-brake wheel is the wheel to which the braking force is not applied during the parking control regardless of whether or not the wheel is the object to be braked by the brake mechanism such as the brake actuator. That is, the non-brake wheel is the wheel to which the braking force is not applied by the brake mechanism (not shown) described below and the braking force applying unit 13 described below during the parking control. Moreover, the non-braking wheel may be the wheel to which the braking force and the driving force are not applied during the parking control.

For example, the wheel setting unit 11 controls a hydraulic circuit or the like included in the vehicle 2 and sets the non-brake wheel and the brake wheel. Alternatively, the wheel setting unit 11 selects the non-brake wheel and the brake wheel from the plurality of wheels, outputs only the selected results to the braking force applying unit 13 described below, and thus, may cause the braking force applying unit 13 to distinguish and control the brake wheel and the non-brake wheel. Alternatively, the wheel setting unit 11 may reset the non-brake wheel to the brake wheel based on the results output by the lock determination unit 14 described below. The wheel setting unit 11 may set the non-brake wheel and the brake wheel during the parking control, and may set the non-brake wheel and the brake wheel at an appropriate timing before the parking control. The wheel setting unit 11 outputs the setting information indicating the non-brake and the brake wheel to the braking force applying unit 13.

For example, the braking force applying unit 13 calculates the braking force applied to the wheel during the parking control. The braking force applying unit 13 may calculate the braking force applied to the wheel based on the target longitudinal force output by the target longitudinal force calculation unit 9. Moreover, the braking force applying unit 13 controls the brake actuator or the like based on the setting information output by the wheel setting unit 11, and may apply the braking force to only the brake wheel. For example, the RR wheel 6C and the RL wheel 6D are set to the brake wheels, and the FR wheel 6A and the FL wheel 6B are set to the non-brake wheel by the wheel setting unit 11. In this case, the braking force applying unit 13 applies the braking force to the RR wheel 6C and the RL wheel 6D and does not apply the braking force to the FR wheel 6A and the FL wheel 6B during the parking control.

In addition, the braking force applying unit 13 may change the braking force with respect to the brake wheel based on the results output by the lock determination unit 14. The lock determination unit 14 determines whether or not the brake wheel is locked based on the rotation amounts of the brake wheel and the non-brake wheel acquired by the rotation amount acquisition unit 10. The lock state indicates a state where the wheels are not rotated on a road surface and slide on the road surface. For example, the lock state is easily generated when a friction coefficient of the road surface is small.

Figure 2:
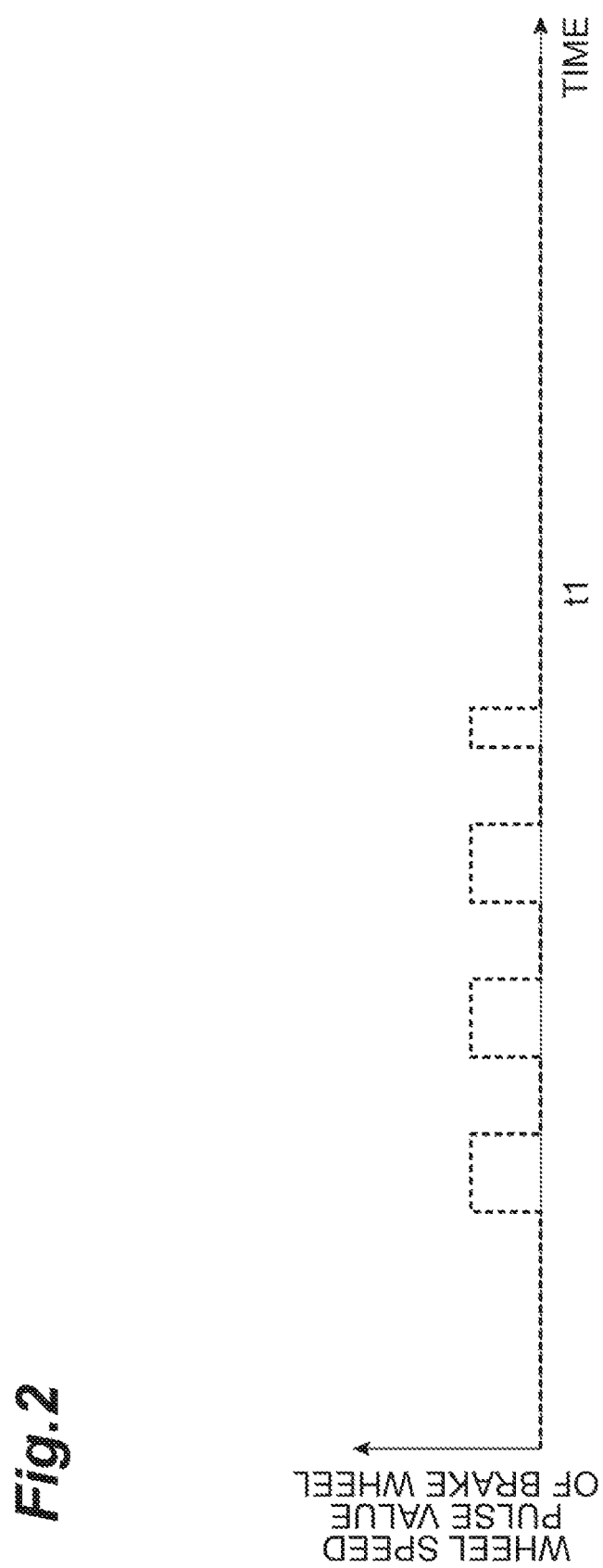
FIG. 2 is a detection result of a wheel speed pulse of a brake wheel when a wheel is locked.
Figure 3:
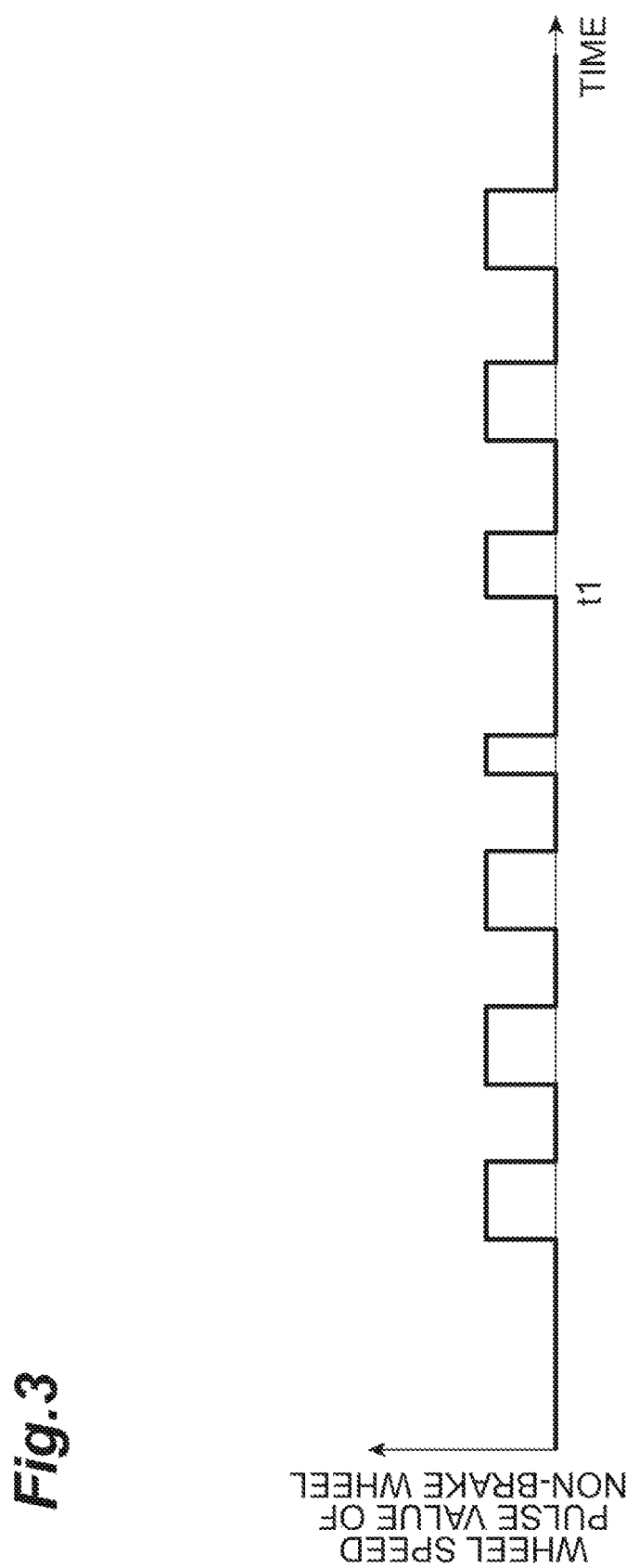
FIG. 3 is a detection result of a wheel speed pulse of a non-brake wheel when a wheel is locked.
Figure 4:
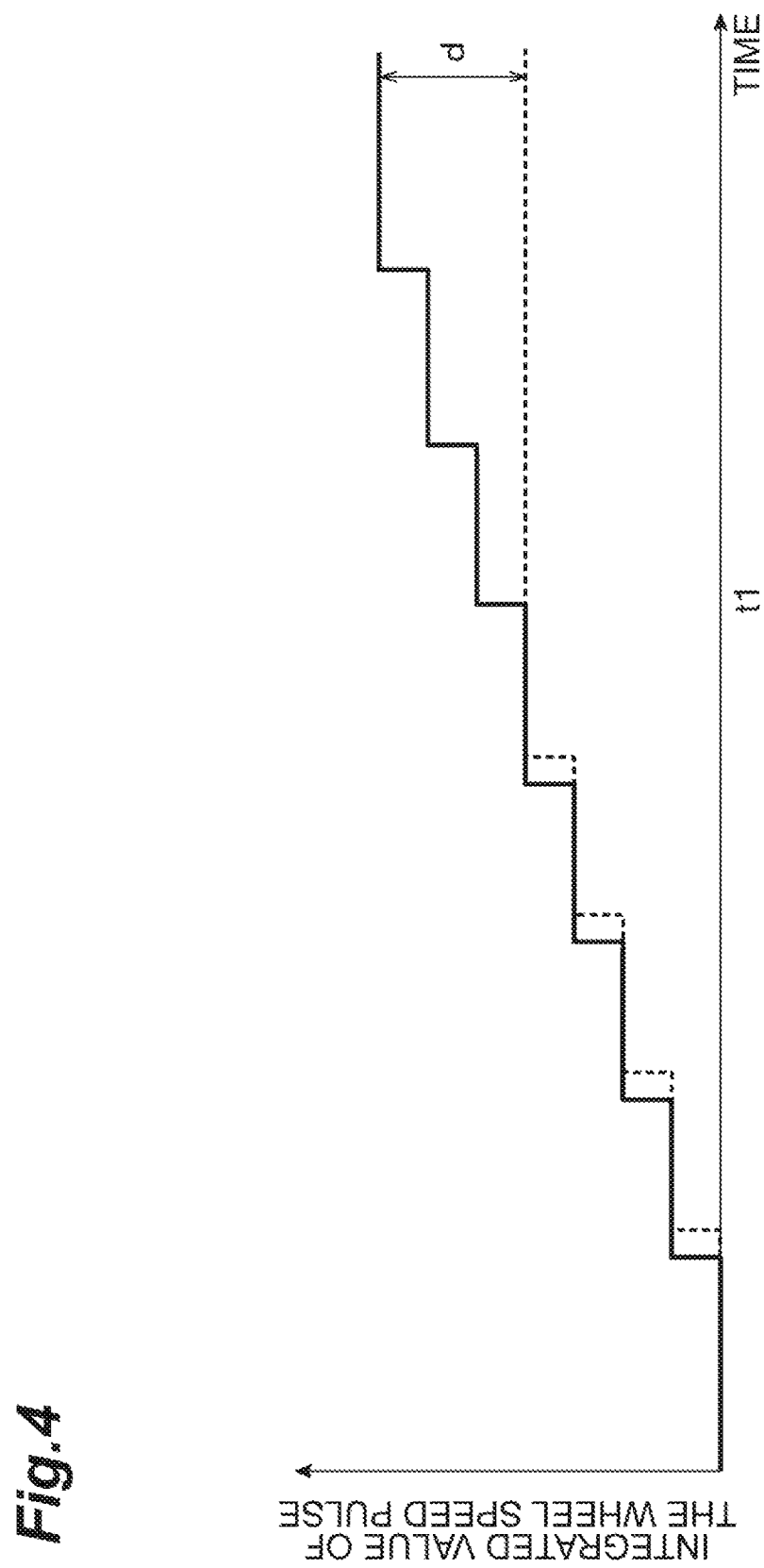
FIG. 4 is a detection result showing integrated values of wheel speed pulses of the brake wheel and the non-brake wheel when the wheel is locked.

FIG. 2 is a graph showing a detection result of a wheel speed pulse of the brake wheel when the wheel is locked, in time series. The vertical axis indicates a wheel speed pulse value, and the horizontal axis indicates a time. FIG. 3 is a graph showing a detection result of a wheel speed pulse of the non-brake wheel when the wheel is locked, in time series. The vertical axis indicates a wheel speed pulse value, and the horizontal axis indicates a time. FIG. 4 is a graph showing an integrated value of the wheel speed pulse of the brake wheel and an integrated value of the wheel speed pulse of the non-brake wheel, in time series. The integrated value of the wheel speed pulse means an integrated value of pulse signals. The vertical axis indicates the integrated value of the wheel speed pulse, and the horizontal axis indicates a time. FIGS. 2 to 4 correspond to one another by the same time axes.

As shown in FIG. 2, when the brake wheel is locked from a time t1, the wheel is not rotated, and thus, the wheel speed pulse is not detected. On the other hand, as shown in FIG. 3, the non-brake wheel is correctly rotated according to the movement of the vehicle 2 even after the time t1, and thus, the wheel speed pulse is detected. The lock determination unit 14 determines whether or not the brake wheel is locked based on a difference between the wheel speed pulse of the brake wheel and the wheel speed pulse of the non-brake wheel. Specifically, as shown in FIG. 4, the lock determination unit 14 may determine whether or not the brake wheel is locked based on a difference d between the integrated value of the wheel speed pulse of the brake wheel and the integrated value of the wheel speed pulse of the non-brake wheel. The lock determination unit 14 outputs the determination result to the braking force applying unit 13. In a case of the determination result in which the brake wheel is locked, the braking force applying unit 13 decreases the braking force with respect to the brake wheel, and may perform a control which releases the lock state of the brake wheel. Alternatively, the lock determination unit 14 calculates the correction amount of the braking force required for the control which releases the lock state, and may output the calculation value to the braking force applying unit 13. The braking force applying unit 13 may correct the braking force based on the correction amount.

In this way, the control unit 12 controls at least one brake wheel based on the rotation amount of at least one brake wheel and the rotation amount of at least one non-brake wheel. Moreover, the control unit 12 estimates the vehicle speed of the vehicle 2 from the rotation amount of at least one non-brake wheel, and may perform the parking assistance using the estimated vehicle speed.

Figure 5:
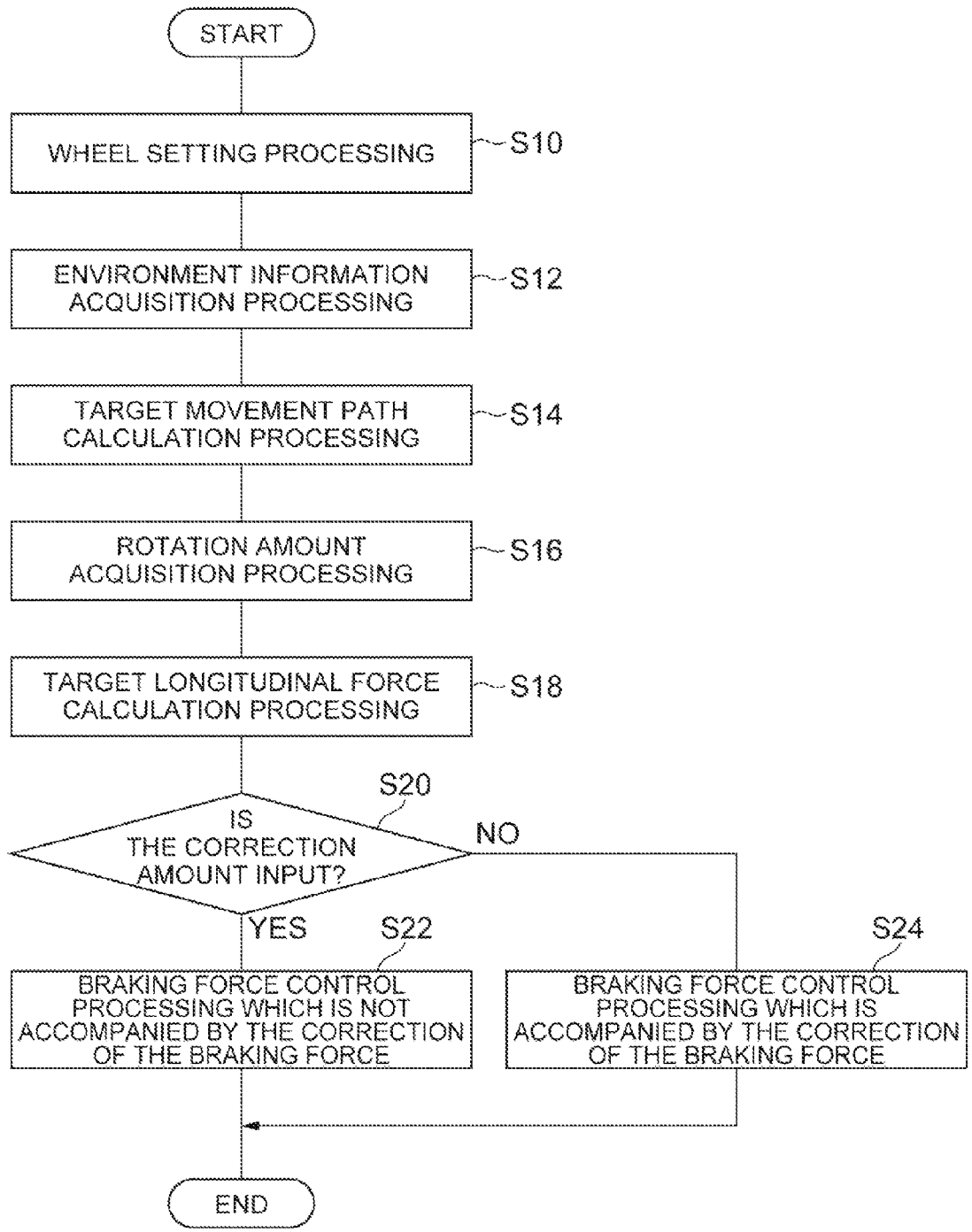
FIG. 5 is a flowchart showing an operation of the vehicle control apparatus shown in FIG. 1.

Next, an operation of the vehicle control apparatus 1 will be described. FIG. 5 is a flowchart showing the operation of the vehicle control apparatus 1. For example, the flowchart shown in FIG. 5 starts at a timing when the signal of the parking assistance starting, in which the vehicle 2 is parked at the target parking position, is input to the vehicle control apparatus 1, and the flowchart is repeatedly performed at a predetermined interval. Moreover, a procedure shown in FIG. 5 becomes a vehicle control method of the vehicle 2.

As shown in FIG. 5, initially, wheel setting processing is performed (S10: set step). In the processing of S10, the wheel setting unit 11 sets the brake wheel and the non-brake wheel. For example, the wheel setting unit 11 sets the RR wheel 6C and the RL wheel 6D to the brake wheels, and sets the FR wheel 6A and the FL wheel 6B to the non-brake wheels. When the processing of S10 ends, the step is transferred to environment information acquisition processing (S12).

In the processing of S12, for example, as the surrounding environment information, the surrounding environment information acquisition device 3 acquires the position information of the parking section line, a wall defining the parking section, or the like required for the parking assistance. When the processing of S12 ends, the step is transferred to target movement path calculation processing (S14).

In the processing of the S14, the target path calculation unit 8 calculates the target path until the target parking position of the vehicle 2 based on the surrounding environment information acquired by the processing of S12. When the processing of S14 ends, the step is transferred to rotation amount acquisition processing (S16: detection step).

In the processing of S16, for example, the rotation amount acquisition unit 10 acquires the rotation amounts of the RR wheel 6C and the RL wheel 6D which are the brake wheels and the rotation amounts of the FR wheels 6A and the FL wheels 6B which are the non-brake wheels, and the rotation amounts are detected by the wheel speed sensors 7A to 7D. Moreover, the rotation amount acquisition unit 10 may acquire the rotation amount of only one non-brake wheel selected from the plurality of non-brake wheels. That is, the rotation amount acquisition unit 10 may acquire the rotation amount of any one of the FR wheel 6A and the FL wheel 6B. When the processing of Step 16 ends, the step is transferred to target longitudinal force calculation processing (S18).

In the processing of S18, the target longitudinal force calculation unit 9 calculates the target longitudinal force of the vehicle based on the target movement path obtained by the processing of S14 and the rotation amount obtained by the processing of S16. When the processing of S18 ends, the step is transferred to input determination processing of the correction amount (S20).

In the processing of S20, the braking force applying unit 13 determines whether or not the correction amount is input to the braking force determined from the target longitudinal force calculated in the processing of S20. The calculation processing of the correction amount will be described below. In the processing of S20, when the correction amount is not input, the step is transferred to braking force control processing which is not accompanied by the correction of the braking force (S22: control step).

In the processing of S22, the braking force applying unit 13 operates the brake actuator or the like with respect to the RR wheel 6C and the RL wheel 6D which are the brake wheels, and applies the braking force to the wheels. For example, the braking force applying unit 13 generates the braking force during the parking control, and stops the vehicle 2. In addition, the control unit 12 estimates the moving state amount of the vehicle 2 using any one of the FR wheel 6A and the FL wheel 6B which are the non-brake wheels, and may control the RR wheel 6C and the RL wheel 6D which are the brake wheels using the moving state amount. The moving state amount of the vehicle 2 is the movement distance, the speed, the acceleration, and the differential value of the acceleration of the vehicle 2. When the processing of S22 ends, the control processing shown in FIG. 5 ends.

On the other hand, in the processing of S20, when the correction amount is input, the step is transferred to the braking force control processing which is accompanied by the correction of the braking force (S24: control step). In the processing of the S24, the braking force applying unit 13 corrects the braking force to be smaller than a predetermined braking force before the correction using the correction amount, and operates the brake actuator or the like with respect to the RR wheel 6C and the RL wheel 6D which are the brake wheels and applies the corrected braking force to the wheels. For example, the braking force applying unit 13 generates the braking force during the parking control, and stops the vehicle 2. In addition, the control unit 12 estimates the vehicle speed using any one of the FR wheel 6A and the FL wheel 6B which are the non-brake wheels, and may control the RR wheel 6C and the RL wheel 6D which are the braking wheels using the vehicle speed. When the processing of S24 ends, the control processing shown in FIG. 5 ends.

As above, the control processing shown in FIG. 5 ends. As shown in FIG. 5, the braking force is applied to only the brake wheel by the braking force applying unit 13 during the parking control. Moreover, the vehicle speed is estimated based on the detection result of the non-brake wheel during the parking control by the control unit 12, and the vehicle speed is used for the parking assistance. Accordingly, it is possible to perform appropriate braking using a correct vehicle speed.

Figure 6:
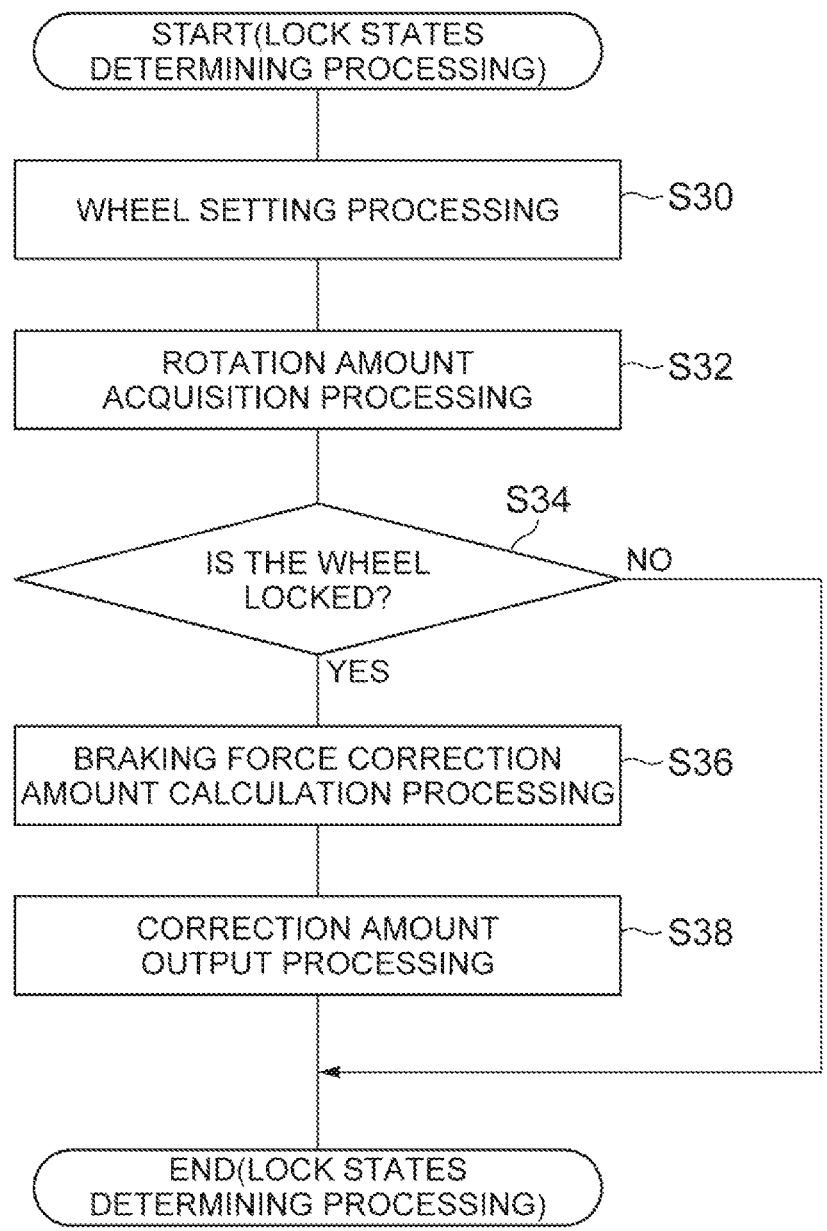
FIG. 6 is a flowchart showing the operation of the vehicle control apparatus shown in FIG. 1.

Next, the determination processing of the lock state and the calculation processing of the correction amount of the braking force will be described in detail. FIG. 6 is a flowchart illustrating an operation of the lock determination unit 14. For example, the flowchart shown in FIG. 6 starts at the timing when the signal of the parking assistance starting is input to the vehicle control apparatus 1, and the flowchart is repeatedly performed at a predetermined interval. Moreover, a procedure shown in FIG. 6 becomes a vehicle control method of the vehicle 2.

As shown in FIG. 6, initially, wheel setting processing is performed (S30). The processing of S30 is similar to the processing of S10. For example, the wheel setting unit 11 sets the RR wheel 6C and the RL wheel 6D to the brake wheels, and sets the FR wheel 6A and the FL wheel 6B to the non-brake wheels. When the processing of S10 is performed, the processing of S30 may be omitted. When the processing of S30 ends, the step is transferred to rotation amount acquisition processing (S32).

In the processing of S32, the rotation amount acquisition unit 10 acquires the rotation amounts of the RR wheel 6C and the RL wheel 6D which are the brake wheels and the rotation amounts of the FR wheel 6A and the FL wheel 6B which are the non-brake wheels. The processing of S32 is similar to the processing of S16. Accordingly, when the processing of S16 is performed, the processing of S32 may be omitted. When the processing of S32 ends, the step is transferred to the processing in which whether or not the wheel is locked is determined (S34: determination step).

In the processing of S34, the lock determination unit 14 compares the wheel speed pulse of the non-brake wheel and the wheel speed pulse of the brake wheel for each brake wheel, and determines whether or not the brake wheel is locked. Hereinafter, initially, the determination processing with respect to the RR wheel 6C will be described.

Figure 7:
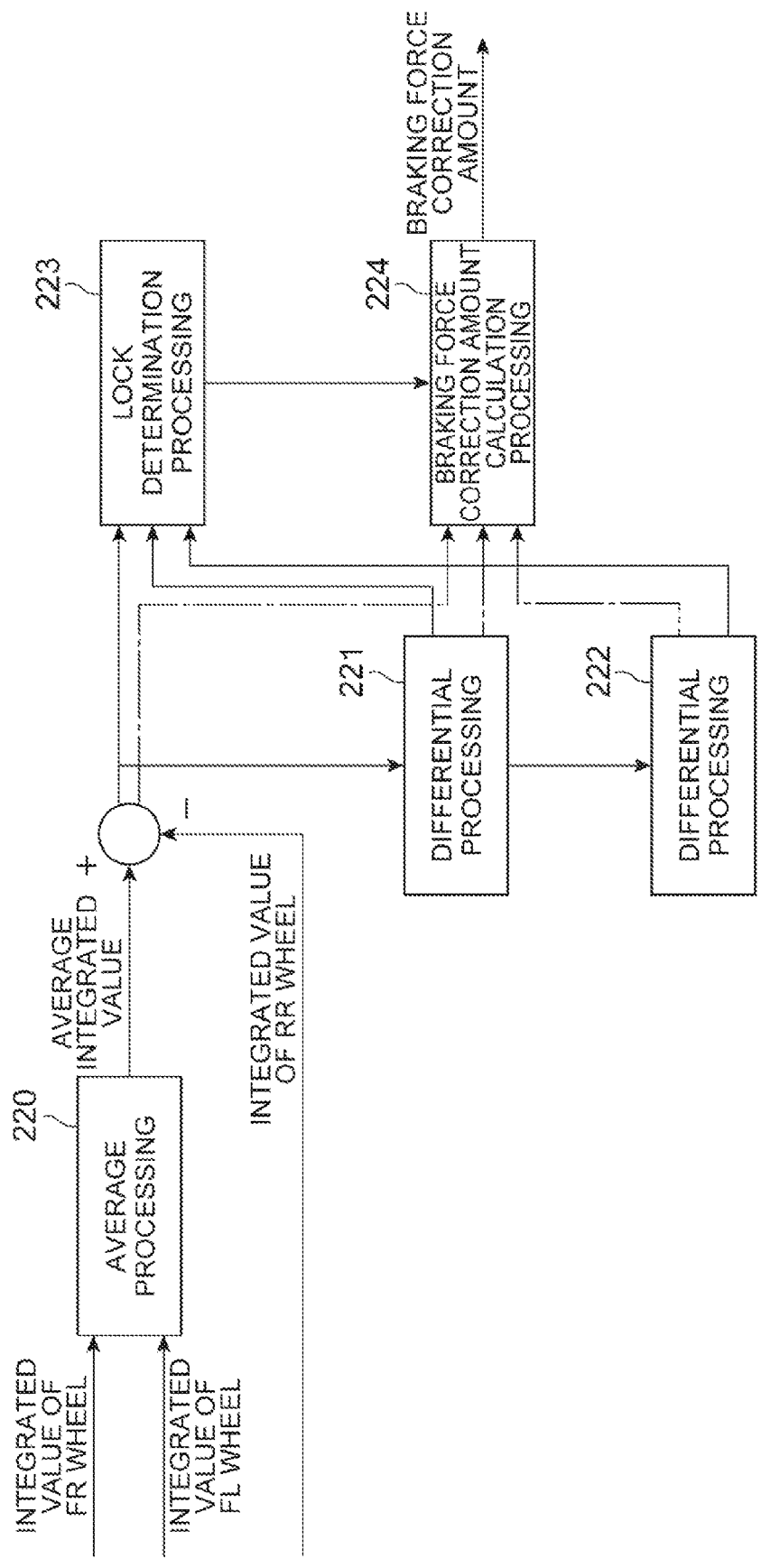
FIG. 7 is a block diagram showing the operation of the vehicle control apparatus shown in FIG. 1.

FIG. 7 is a block diagram showing details of the determination processing and the details of the calculation processing of the braking force correction amount. As shown in FIG. 7, initially, the lock determination unit 14 calculates the integrated value of the wheel speed pulse of the brake wheel which is the object to be processed. That is, the lock determination unit 14 calculates the integrated value of the wheel speed pulse of the RR wheel 6C. Next, the lock determination unit 14 calculates the integrated value of the wheel speed pulse of the non-brake wheel. When the plurality of non-brake wheels exist, the lock determination unit 14 calculates the wheel speed pulse of at least one non-brake wheel. When the wheel speed pulses of the plurality of non-brake wheels are used, the lock determination unit 14 averages the integrated values of the wheel speed pulses of the non-brake wheels, and calculates an average integrated value of the wheel speed pulses of the non-brake wheels. For example, the lock determination unit 14 calculates the integrated value of the wheel speed pulse of the FR wheel 6A and the integrated value of the wheel speed pulse of the FL wheel 6B, and calculates the average integrated value (average processing 220).

Next, the lock determination unit 14 calculates the difference between the integrated value (or the average integrated value) of the non-brake wheels and the integrated value of the brake wheels. Moreover, the lock determination unit 14 may calculate a differential value of the integrated value differences (differential processing 221). In addition, the lock determination unit 14 may calculate a second order differential value of the differences of the integrated values (differential processing 222). The lock determination unit 14 determines the lock state of the RR wheel 6C which is the brake wheel using at least one of the integrated value differences, the differential value of the integrated value differences, and the second order differential value of the integrated value differences. Here, when the integrated value difference is defined as A, the difference value of the integrated value differences is defined as B, and the second order differential value of the integrated value difference is defined as C, and if threshold values for determining the lock states are defined as K1, K2, and K3, respectively, for example, whether or not it is a lock state is determined by using the following Expressions (lock determination processing 223).

$$\text{Integrated Value Difference } A > \text{First Threshold Value } K1 \quad (1)$$

$$\text{Differential Value } B \text{ of Integrated Value Difference} > \text{Second Threshold Value } K2 \quad (2)$$

$$\text{Second Order Differential Value } C \text{ of Integrated Value Difference} > \text{Third Threshold Value } K3 \quad (3)$$

In the above, the first threshold value K1, the second threshold value K2, and the third threshold value K3 are threshold values for determining the lock states, and for example, are predetermined values determined in advance by an actual measurement value. When any one of Expressions (1) to (3) is satisfied, the lock determination unit 14 may determine that the RR wheel 6C which is the brake wheel is locked. Alternatively, Expression in which two or more inequalities selected from the three inequalities are combined by an AND condition or an OR condition is prepared, and when Expression is satisfied, the lock determination unit 14 may determine that the RR wheel 6C which is the brake wheel is locked. The lock determination unit 14 performs similar processing with respect to all brake wheels set in the vehicle 2.

Returning to the processing of S34 of FIG. 6, when the lock determination unit 14 determines that the lock state is not generated, the control processing shown in FIG. 6 ends. On the other hand, when the lock determination unit 14 determines that the lock state is generated, the step is transferred to braking force correction amount calculation processing (S36).

In the processing of S36, the lock determination unit 14 calculates the correction amount which decreases the braking force and can release the lock state of the brake wheel. As shown in FIG. 7, the lock determination unit 14 calculates the correction amount of the RR wheel which is the brake wheel using at least one of the integrated value differences, the differential value of the integrated value differences, and the second order differential value of the integrated value differences (braking force correction amount calculation processing 224).

Figure 8:
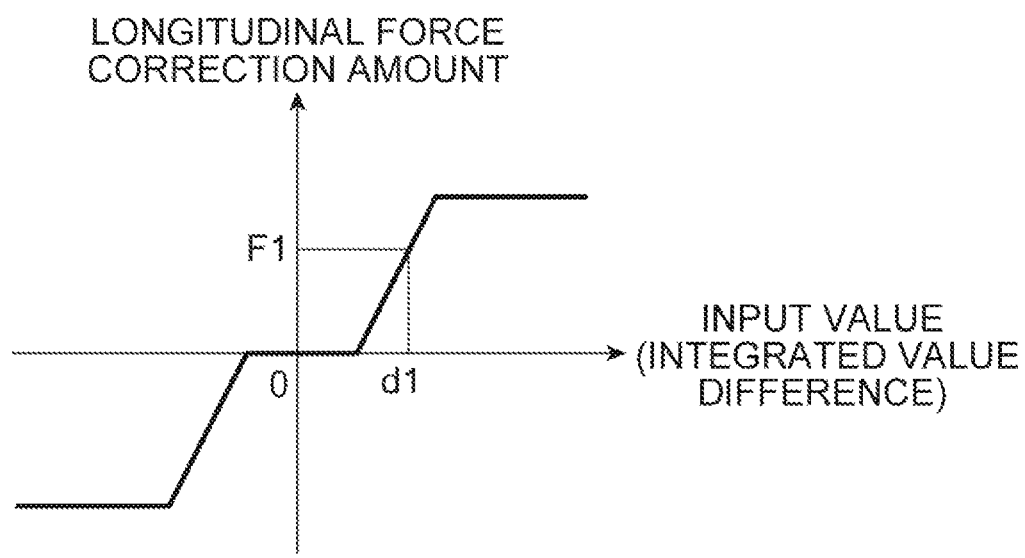
FIG. 8 is a graph showing a relationship between an integrated value difference and a correction amount of a longitudinal force.
Figure 9:
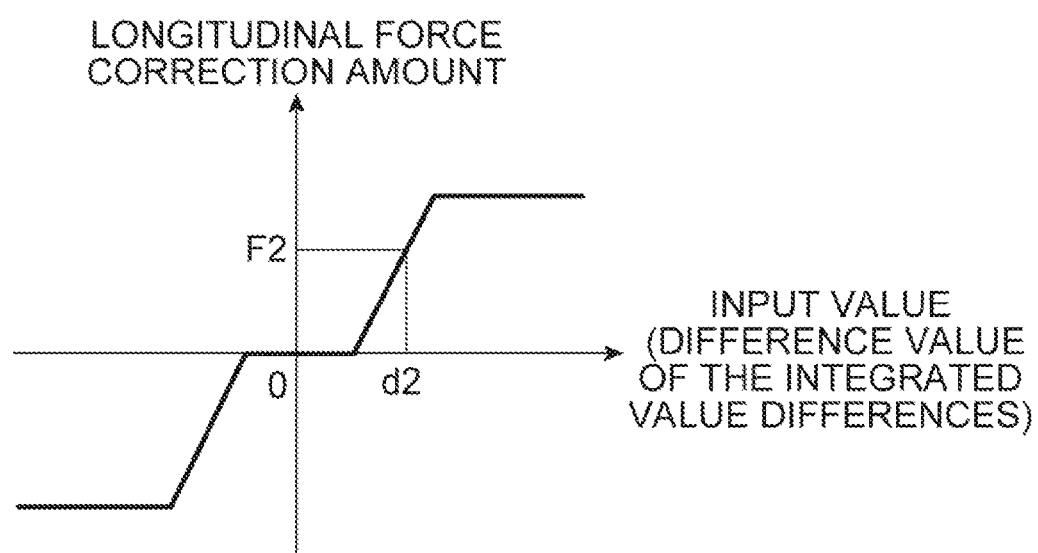
FIG. 9 is a graph showing a relationship between the differential value of the integrated value difference and the correction amount of the longitudinal force.
Figure 10:
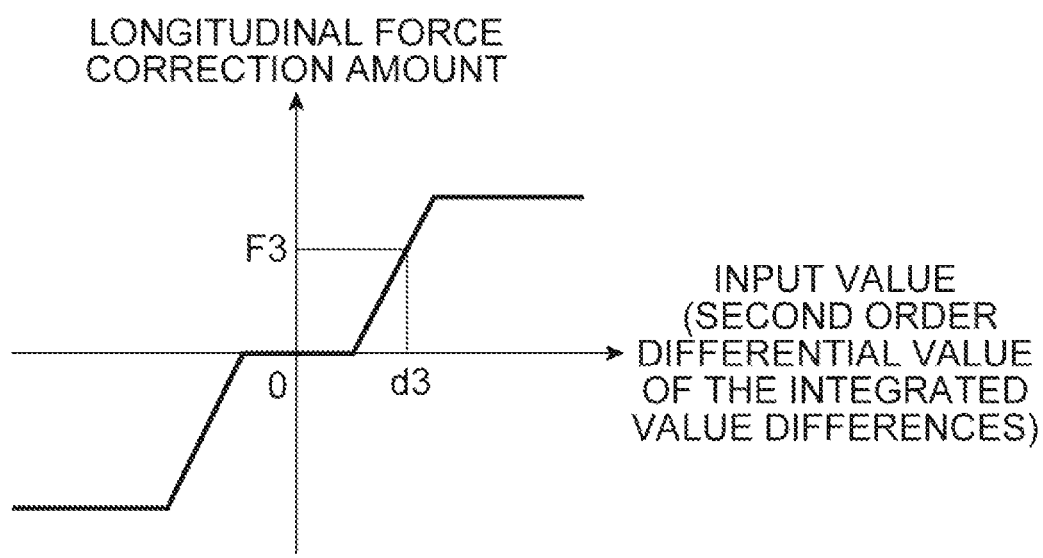
FIG. 10 is a graph showing a relationship between the second order differential value of the integrated value difference and the correction amount of the longitudinal force.

For example, the lock determination unit calculates the correction amount of the braking force using a graph shown in FIG. 8. FIG. 8 is the graph showing the relationship between the integrated value difference and the longitudinal force correction amount. The horizontal axis indicates an input value (integrated value difference), and the vertical axis indicates the longitudinal force correction amount. FIG. 9 is a graph showing a relationship between the difference value of the integrated value differences and the longitudinal force correction amount. The horizontal value indicates an input value (the difference value of the integrated value differences), and the vertical axis indicates the longitudinal force correction amount. FIG. 10 is a graph showing a relationship between the second order differential value of the integrated value differences and the longitudinal force correction amount. The horizontal axis indicates an input value (the second order differential value of the integrated value differences), and the vertical axis indicates the longitudinal force correction amount.

As shown in FIG. 8, when the integrated value difference is a positive value d1, the longitudinal force correction amount becomes a positive value F1. When the integrated value difference is the positive value d1, since the brake wheel is locked, it is necessary to add a positive value with respect to the braking force having a negative value and decrease an absolute value of the braking force. Accordingly, the lock determination unit 14 adds the positive value F1 in the front direction of the vehicle to the braking force (negative value) before the correction. Therefore, the corrected braking force is decreased, and thus, it is possible to release the lock state.

In addition, as shown in FIG. 9, when the differential value of the integrated value difference is a positive value d2, the longitudinal force correction amount becomes a positive value F2. When the differential value of the integrated value differences is the positive value d7, since the integrated value difference is gradually increased, it is highly likely that the brake wheel is locked. Accordingly, it is necessary to add a positive value with respect to the braking force having a negative value and decrease the absolute value of the braking force. Therefore, the lock determination unit 14 adds the positive value F2 in the front direction of the vehicle to the braking force (negative value) before the correction. Accordingly, the corrected braking force is decreased, and thus, it is possible to release the lock state.

Moreover, as shown in FIG. 10, when the second order difference value of the integrated value differences is a positive value d3, the longitudinal force correction amount becomes a positive value F3. When the second order difference value of the integrated value differences is the positive value d3, since the integrated value difference is abruptly changed, it is high likely that the brake wheel is locked. Accordingly, it is considered to add a positive value with respect to the braking force having a negative value and decrease the absolute value of the braking force. Therefore, the lock determination unit 14 adds the positive value F3 in the front direction of the vehicle to the braking force (negative value) before the correction. Accordingly, the corrected braking force is decreased, and thus, it is possible to release the lock state.

By adopting any one or the combination of maps shown in FIGS. 8 to 10, it is possible to correct the finally applied braking force to be decreased. In addition, the lock determination unit 14 is not limited to the case where the correction amount is calculated using a graph or a map. For example, a gain value is changed with at least one of the integrated value differences, the difference value of the integrated value differences, and the second order difference value of the integrated value differences as a parameter, and the correction amount of the braking force may be calculated.

When the processing of S36 of FIG. 6 ends, the step is transferred to correction amount output processing (S38). In the processing of S38, the lock determination unit 14 outputs the correction amount calculated by the processing of S36 to the braking force applying unit 13. When the processing of S38 ends, the control processing shown in FIG. 6 ends.

By performing the control processing shown in FIG. 6, the lock state of the brake wheel is determined using the difference between the integrated value of the wheel speed pulse of the non-brake wheel and the integrated value of the wheel speed pulse of the brake wheel.

As described above, in the vehicle control apparatus 1 according to the first embodiment, at least one brake wheel and at least one non-brake wheel are set by the wheel setting unit 11. Even when the brake wheel is locked, the non-brake wheel is rotated according to the movement of the vehicle. Accordingly, it is possible to perform appropriate parking assistance even during the parking control of a relatively low speed by using the rotation amount of at least one non-brake wheel.

In addition, in the vehicle control apparatus 1 according to the first embodiment, the control unit 12 estimates the vehicle speed based on the rotation amount of at least one non-brake wheel, and may control at least one brake wheel using the vehicle speed. Compared to the brake wheel, the non-brake wheel is correctly rotated according to the movement of the vehicle. Accordingly, it is possible to estimate an accurate vehicle speed using the rotation amount of the non-brake wheel. Therefore, it is possible to perform an appropriate brake using the accurate vehicle speed. Moreover, it is possible to appropriately operate a release system of the lock state such as Anti-lock Braking System (ABS) using the accurate vehicle speed.

Moreover, in the vehicle control apparatus 1 according to the first embodiment, the control unit 12 determines whether or not the brake wheel is locked based on the difference between the rotation amount of one brake wheel and the rotation amount of at least one non-brake wheel, and may control the brake wheel based on the determination result. Since the non-brake wheel which is more accurately rotated than the brake wheel according to the movement of the vehicle 2 is the reference, it is possible to accurately determine whether or not the brake wheel is locked.

Second Embodiment

A vehicle control apparatus according to a second embodiment is configured to be approximately similar to the vehicle control apparatus 1 according to the first embodiment, and is different from the first embodiment in that the non-brake wheel is reset to the brake wheel during the parking control, and the braking force is applied to the reset brake wheel. Hereinafter, in consideration of easy understanding of descriptions, differences between the vehicle control device according to the second embodiment and the vehicle control device 1 according to the first embodiment are mainly described, and overlapping descriptions are omitted.

The configuration of the vehicle control apparatus according to the present embodiment is approximately similar to the configuration according to the first embodiment, and is different in that the non-brake wheel is reset to the brake wheel by the wheel setting unit 11 during the parking control and the braking force applying unit 13 controls the braking force of the entire vehicle including the reset brake wheel, and other configurations are the same as each other.

Figure 11:
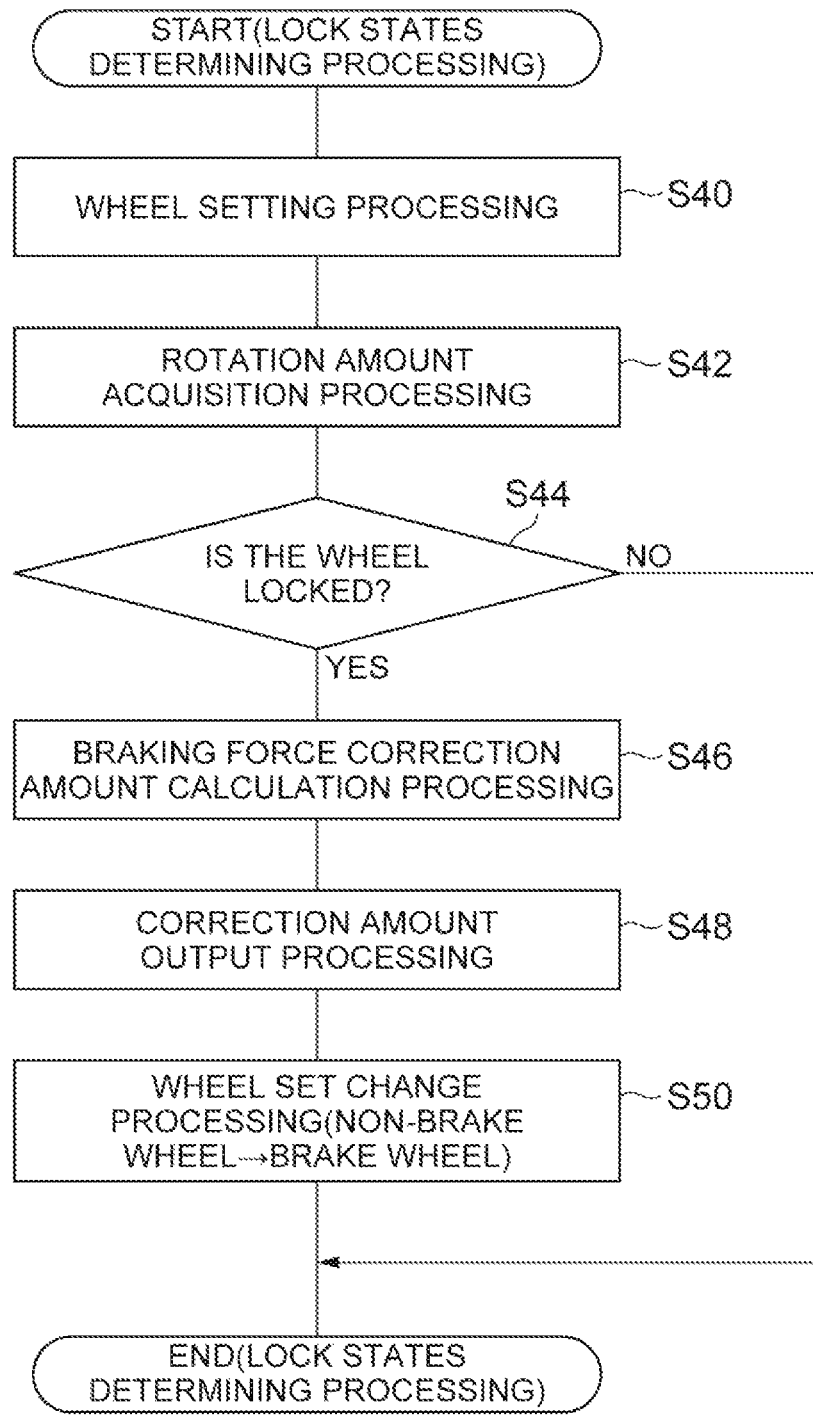
FIG. 11 is a flowchart showing an operation of a vehicle control apparatus according to a second embodiment.

The operation of the vehicle control apparatus according to the present embodiment is similar to that of the vehicle control apparatus 1 according to the first embodiment shown in FIGS. 5 and 6. Accordingly, only processing of a wheel set change will be described in detail. FIG. 11 is a flowchart of the operation of the vehicle control apparatus 1 according to the present embodiment. The flowchart shown in FIG. 11 is approximately similar to the flowchart shown in FIG. 6, and only the wheel set change processing is different.

As shown in FIG. 11, initially, wheel setting processing is performed (S40). The processing of S40 is similar to the processing of S30. For example, the wheel setting unit 11 sets the RR wheel 6C and the RL wheel 6D to the brake wheels, and sets the FR wheel 6A and the FL wheel 6B to the non-brake wheels. When the processing of S10 and S30 is performed, the processing of S40 may be omitted. When the processing of S40 ends, the step is transferred to rotation amount acquisition processing (S42).

In the processing of S42, the rotation amount acquisition unit 10 acquires the rotation amounts of the RR wheel 6C and the RL wheel 6D which are the brake wheels and the rotation amounts of the FR wheel 6A and the FL wheel 6B which are the non-brake wheels. The processing of S42 is similar to the processing of S32. Accordingly, when the processing of S32 is performed, the processing of S42 may be omitted. When the processing of S42 ends, the step is transferred to the processing in which whether or not the wheel is locked is determined (S44).

In the processing of S44, the lock determination unit 14 compares the wheel speed pulse of the non-brake wheel and the wheel speed pulse of the brake wheel for each brake wheel, and determines whether or not the brake wheel is locked. The processing of S44 is similar to the processing of S34. When the lock determination unit 14 determines that the lock state is not generated, the control processing shown in FIG. 11 ends. On the other hand, when the lock determination unit 14 determines that the lock state is generated, the step is transferred to braking force correction amount calculation processing (S46).

In the processing of S46, the lock determination unit 14 calculates the correction amount which decreases the braking force and can release the lock state of the brake wheel. The processing of S46 is similar to the processing of S36. When the processing of S46 ends, the step is transferred to output processing (S48).

In the processing of S48, the lock determination unit 14 outputs the correction amount calculated by the processing of S46 to the braking force applying unit 13. When the processing of S48 ends, the step is transferred to the wheel set change processing (S50).

In the processing of S50, the wheel setting unit 11 resets the non-brake wheel to the brake wheel. For example, the wheel setting unit 11 resets the FR wheel 6A and the FL wheel 6B which are the non-brake wheels to the brake wheels. Here, the reset wheels may be all non-brake wheels, or may be a portion of all non-brake wheels. That is, the wheel setting unit 11 may reset only the FR wheel 6A to the brake wheel, and may reset only the FL wheel 6B to the brake wheel. When the processing of S50 ends, the control processing shown in FIG. 11 ends.

By performing the control processing shown in FIG. 11, when at least one brake wheel is locked, at least one non-brake wheel is reset to the brake wheel by the wheel setting unit 11. Accordingly, it is possible to newly apply the braking force to the reset brake wheel. Therefore, even when the brake wheel is locked, it is possible to appropriately perform the parking control using the reset brake wheel.

Figure 12:
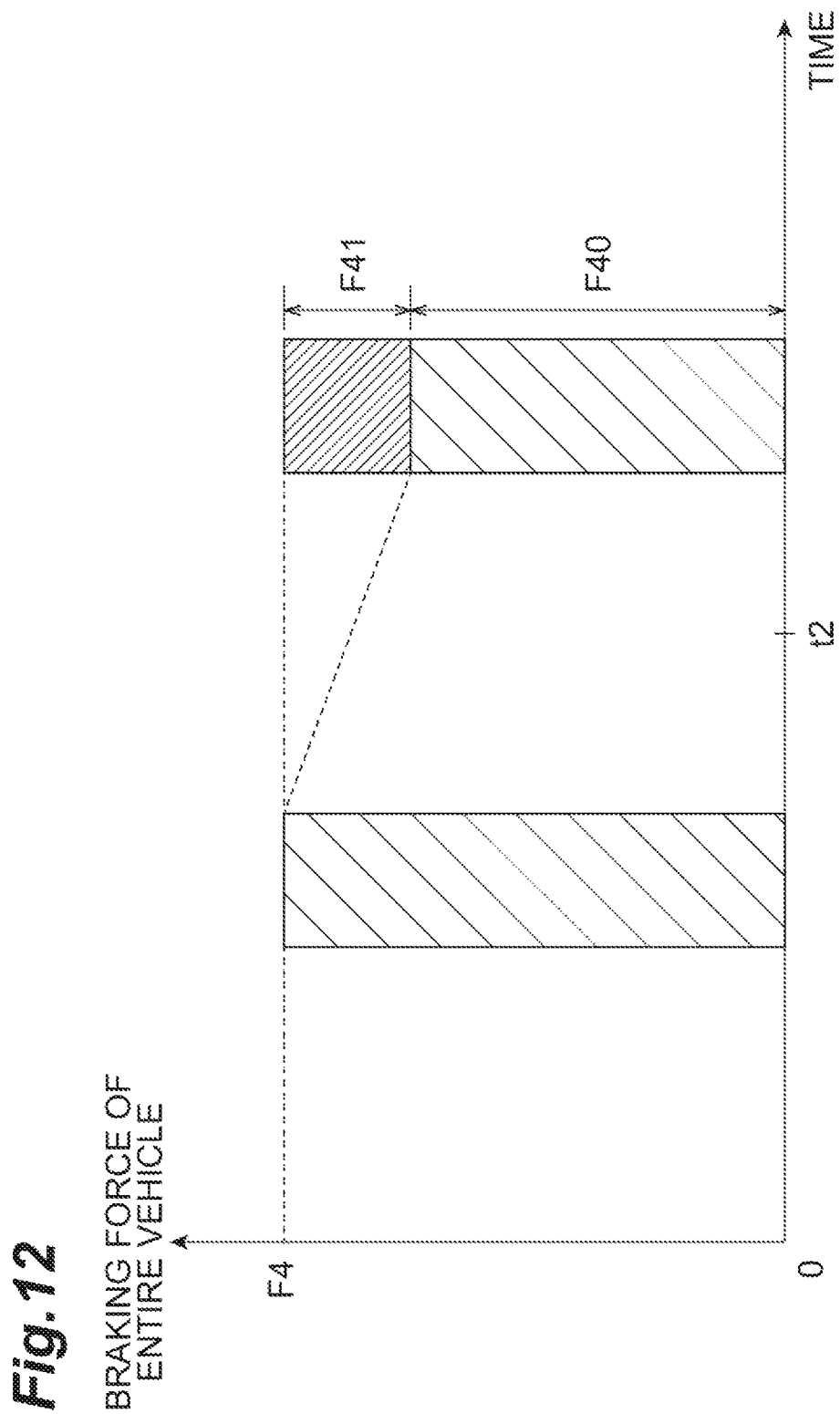
FIG. 12 is a schematic diagram illustrating distribution of a braking force.

The control of the braking force of the braking force applying unit 13 before and after the resetting is performed will be described. FIG. 12 is a graph showing how the braking force of the entire vehicle is changed before and after the lock is generated. The horizontal axis indicates a time, and the vertical axis indicates the braking force of the entire vehicle. Here, before a time t2, the RR wheel 6C and the RL wheel 6D are set to the brake wheels, and the FR wheel 6A and the FL wheel 6B are set to the non-brake wheels. Moreover, at the time t2, the RR wheel 6C and the RL wheel 6D are locked, and only the FR wheel 6A is reset to the brake wheel. The braking force applying unit 13 distributes the braking forces of the entire vehicle to the brake wheels, and controls each brake wheel by a distributed braking force. When the braking force of the entire vehicle before the lock is generated is defined as F4, the braking force applying unit 13 distributes the braking force F4 to the RR wheel 6C and the RL wheel 6D, and controls the RR wheel 6C and the RL wheel 6D by the distributed braking force.

Here, when the RR wheel 6C and the RL wheel 6D are locked, the braking force applying unit 13 decreases the braking force with respect to the RR wheel 6C and the RL wheel 6D to release the lock state. However, in this case, the braking force of the entire vehicle is likely to be smaller than the initial braking force F4. When the braking force of the entire vehicle is smaller than the initial braking force F4, there is a concern that variation in accelerations accompanied by the change of the braking force may be increased. Accordingly, the braking force applying unit 13 applies the brake wheel to the reset FR wheel 6A. According to this configuration, even when the braking force is decreased to release the lock state of the brake wheel, it is possible to decrease the variation in the braking forces of the entire vehicle. The braking force applying unit 13 may distribute the braking force to the reset brake wheel so that the braking force of the entire vehicle is not changed before and after the lock state. That is, the braking force applying unit 13 may apply the braking force to the one reset or plurality of reset brake wheels corresponding to the braking force decreasing with respect to the locked brake wheel. For example, when the braking force F4 is the same as an addition value between a braking force F40 and a braking force F41, the braking force F40 is applied to the RR wheel 6C and the RL wheel 6D, and the braking force F41 is applied to the FR wheel 6A by the braking force applying unit 13. According to this configuration, even when the braking force is decreased to release the lock state of the brake wheel, the reset brake wheel can compensate for the decreased braking force. Accordingly, it is possible to prevent the braking force of the entire vehicle from being changed.

Moreover, as described above, when only one of two non-brake wheels is changed to the brake wheel, after the resetting is performed, one non-brake wheel exists. In this way, regardless of the processing of the resetting, by securing at least one non-brake wheel, even when the non-brake wheel is reset to the brake wheel and the variation in the braking force of the entire vehicle is prevented, it is possible to accurately understand the movement of the vehicle using the remaining non-brake wheel. Accordingly, it is possible to prevent the braking force of the entire vehicle from being changed and to accurately determine whether or not the brake wheel is locked.

Third Embodiment

A vehicle control apparatus 1A according to a third embodiment is configured to be approximately similar to the vehicle control apparatus 1 according to the first embodiment, and is different from the first embodiment in that a lock determination unit 14A is operated using information acquired by a steering sensor. Hereinafter, in consideration of easy understanding of descriptions, differences between the vehicle control device according to the third embodiment and the vehicle control device 1 according to the first embodiment are mainly described, and overlapping descriptions are omitted.

The configuration of the vehicle control apparatus 1A according to the present embodiment is approximately similar to the configuration according to the first embodiment, and the function of the lock determination unit 14A is different from each other.

Figure 13:
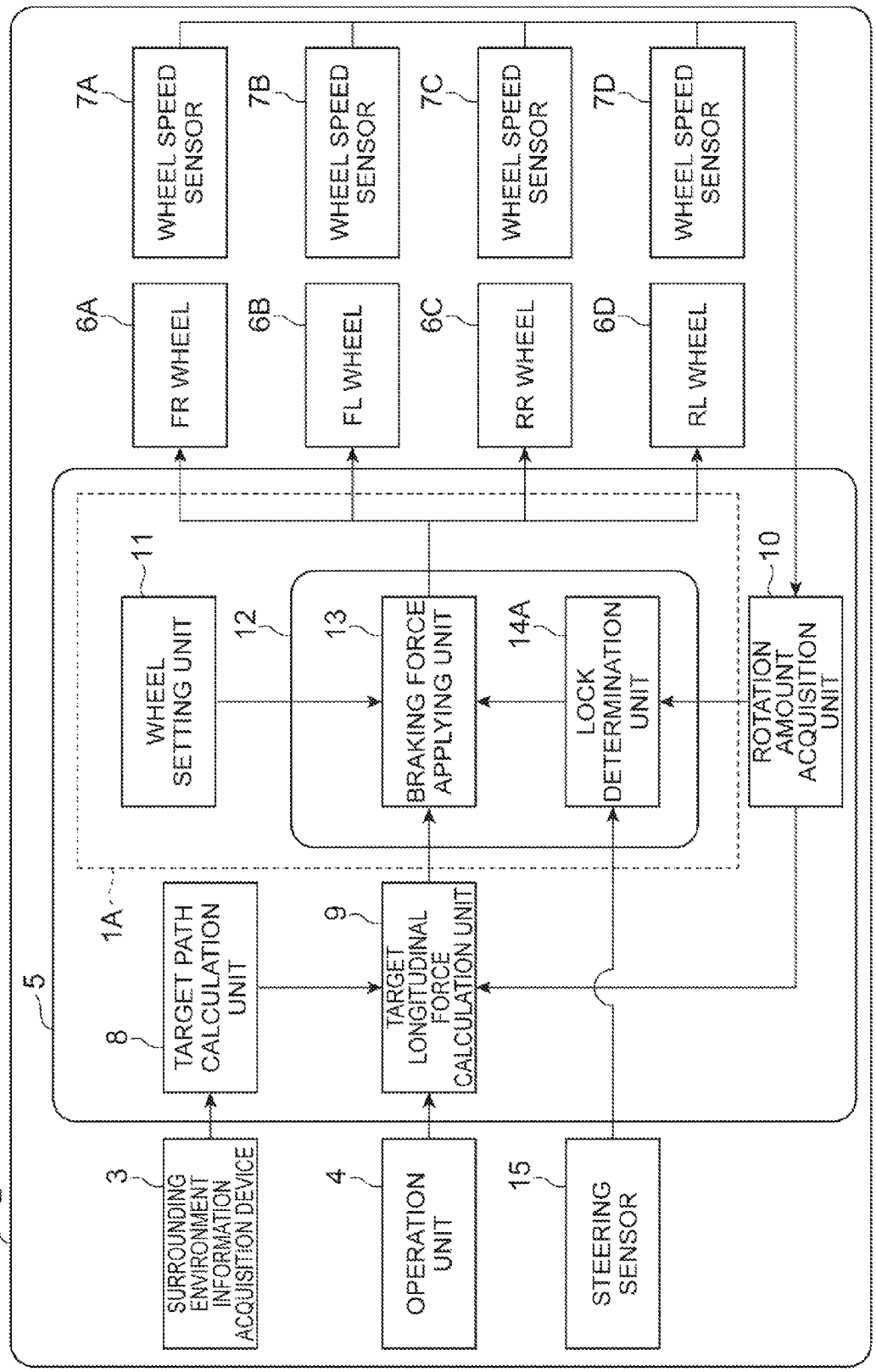
FIG. 13 is a block diagram showing a configuration of a vehicle including a vehicle control apparatus according to a third embodiment.

As shown in FIG. 13, the vehicle 2 includes a steering sensor 15. The steering sensor 15 is a sensor which detects a steering angle of a handle. The steering sensor 15 outputs the steering angle to the lock determination unit 14.

A basic operation of the lock determination unit 14A is the same as the operation of the lock determination unit 14. The lock determination unit 14A determines whether or not the brake wheel is locked considering the steering angle. For example, when the vehicle 2 travels on a curved road, even though the lock state is not generated, the rotation amount in the inner wheel of the curve and the rotation amount in the outer wheel of the curve may be different from each other. Accordingly, for example, when the steering angle is equal to or more than a predetermined value, the lock determination unit 14 performs the lock determination in a state of expecting the difference between the rotation amounts of the non-brake wheel and the brake wheel generated by the curve in advance. For example, the lock determination unit 14A subtracts the difference between the rotation amounts generated by the curve when the steering angle is equal to or more than a predetermined value from the current difference, and performs the lock determination using the subtracted value.

In addition, the lock determination unit 14A may change the threshold value used for the lock determination considering the steering angle. For example, the lock determination unit 14A may set the first threshold value K1, the second threshold value K2, and the third threshold value K3 greatly as the steering angle is increased. In addition, the lock determination unit 14A may change the correction amount of the braking force according to the steering angle. For example, the lock determination unit 14A may change the correction amount according to the steering angle referring to the detected value of the steering sensor 15, correction maps which are associated with the steering angle and shown in FIGS. 8 to 10, and the correction map according to the steering angle. Other configurations of the vehicle control apparatus 1A are the same as those of the vehicle control apparatus 1.

As described above, according to the vehicle control apparatus 1A of the third embodiment, since the determination of the rotation amount of each wheel can be changed according to the steering, it is possible to improve accuracy of the lock determination. In addition, when the brake wheel is locked, it is possible to reset at least one non-brake wheel other than the non-brake wheel, which is used to determine whether or not the brake wheel is locked, to the brake wheel. Accordingly, it is possible to realize accuracy improvement of the vehicle speed while determining the lock state.

As described above, the embodiments are described. However, the present invention is not limited to the embodiments. For example, as described below, the present invention may be used in a vehicle travel control.

A vehicle control apparatus 1B performing the vehicle travel control is configured to be approximately similar to the vehicle control apparatus 1A according to the third embodiment, and is different from the vehicle control apparatus 1A according to the third embodiment in that not only the lock determination but also slip determination are performed, not only the braking force but also the driving force are applied to the wheel, and not only the parking control but also the vehicle travel control are performed. Hereinafter, in consideration of easy understanding of descriptions, differences between the vehicle control device 1B and the vehicle control device 1A according to the third embodiment are mainly described, and overlapping descriptions are omitted.

The configuration of the vehicle control apparatus 1B performing the vehicle travel control is approximately similar to the configuration according to the third embodiment, and is different in that the vehicle control apparatus 1B includes a lock and slip determination unit 14B and a braking force and driving force applying unit 16B. In addition, the vehicle control apparatus 1B is an apparatus which assists the travel accompanied by the brake, and for example, relates to the travel control during a traffic jam when convoy travelling assistance is performed, more specifically, when the vehicle becomes less than or equal to a predetermined speed (for example, 2 km/h or less in a low speed region) and stops. The travel control includes an automatic travel control which automatically controls and travels the vehicle, a control which performs only the assistance of the travel by the notification or the like to the driver, or a control which causes the driver and vehicle equipment to cooperatively operate and perform the travel assistance.

Figure 14:
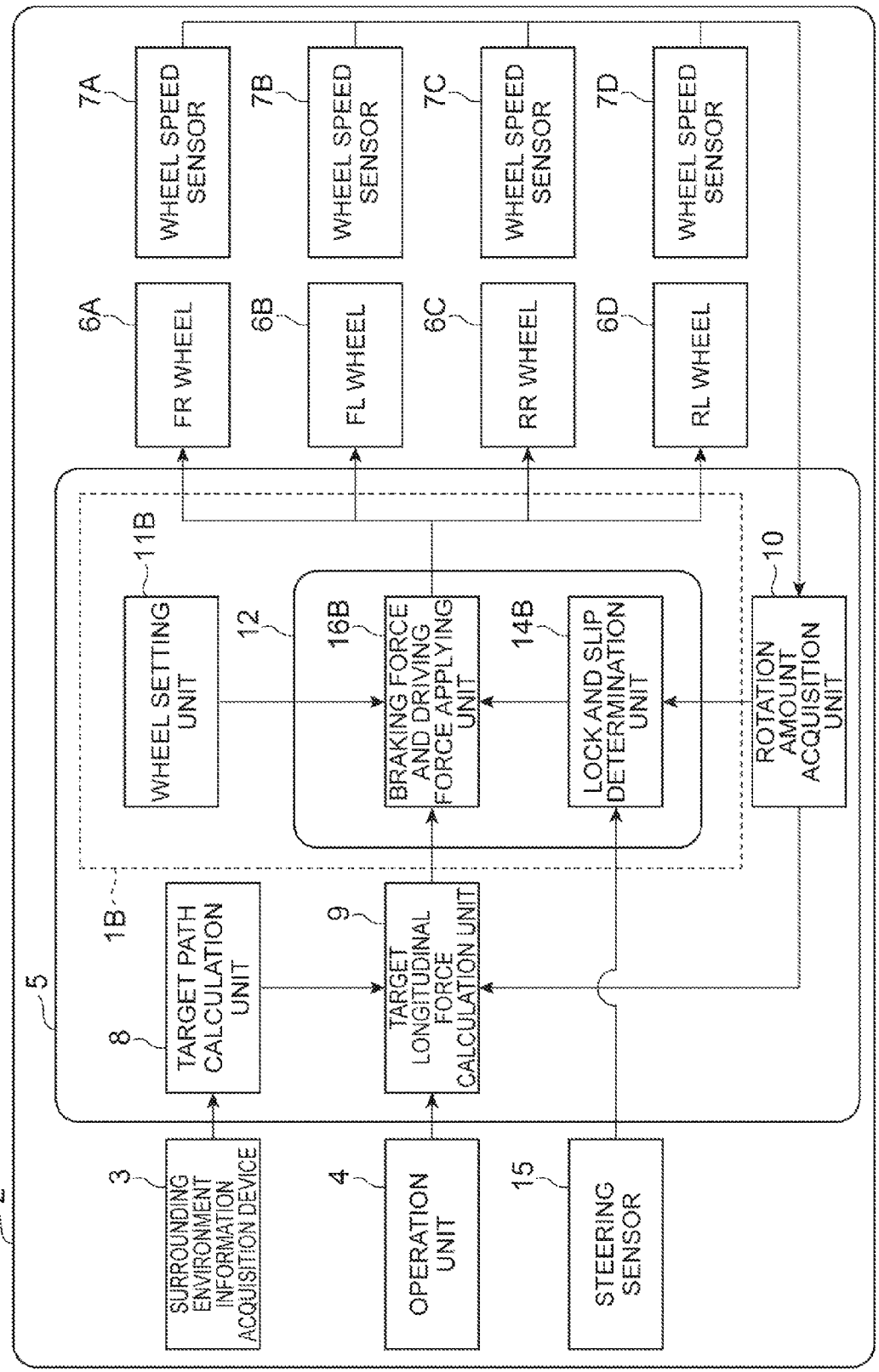
FIG. 14 is a block diagram showing a configuration of a vehicle including a vehicle control apparatus according to a fourth embodiment.

As shown in FIG. 14, the vehicle control apparatus 1B includes a wheel setting unit 11B, a lock and slip determination unit 14B, and a braking force and driving force applying unit 16B.

Similar to the first embodiment, the wheel setting unit 11B sets the brake wheel and the non-brake wheel. Here, the non-brake wheel according to the present embodiment is a wheel to which the braking force and the driving force are not applied during the travel control. The brake wheel according to the present embodiment is a wheel to which the braking force and the driving force are applied during the travel control.

The lock and slip determination unit 14B performs the lock determination similar to the first embodiment. Moreover, the lock and slip determination unit 14B performs the slip determination using the wheel speed pulses of the non-brake wheel and the brake wheel.

Figure 15:
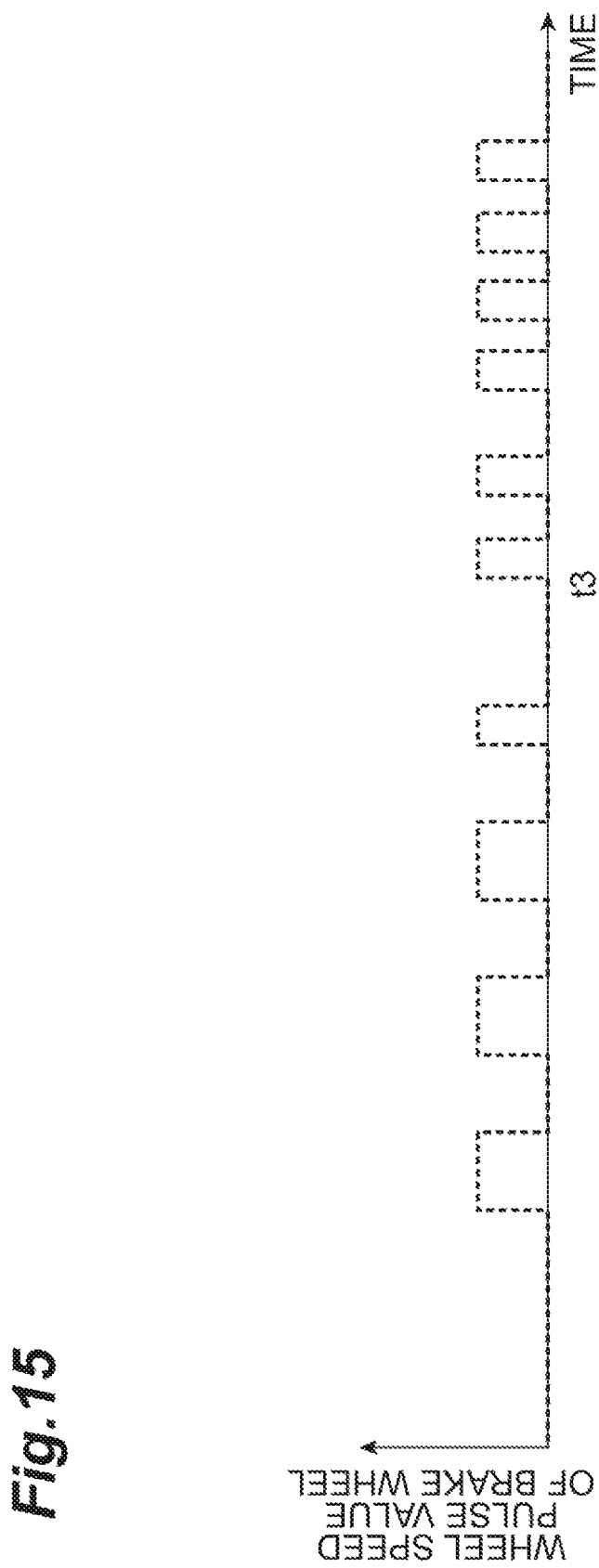
FIG. 15 is a detection result of the wheel speed pulse of the brake wheel when the wheel slips.
Figure 16:
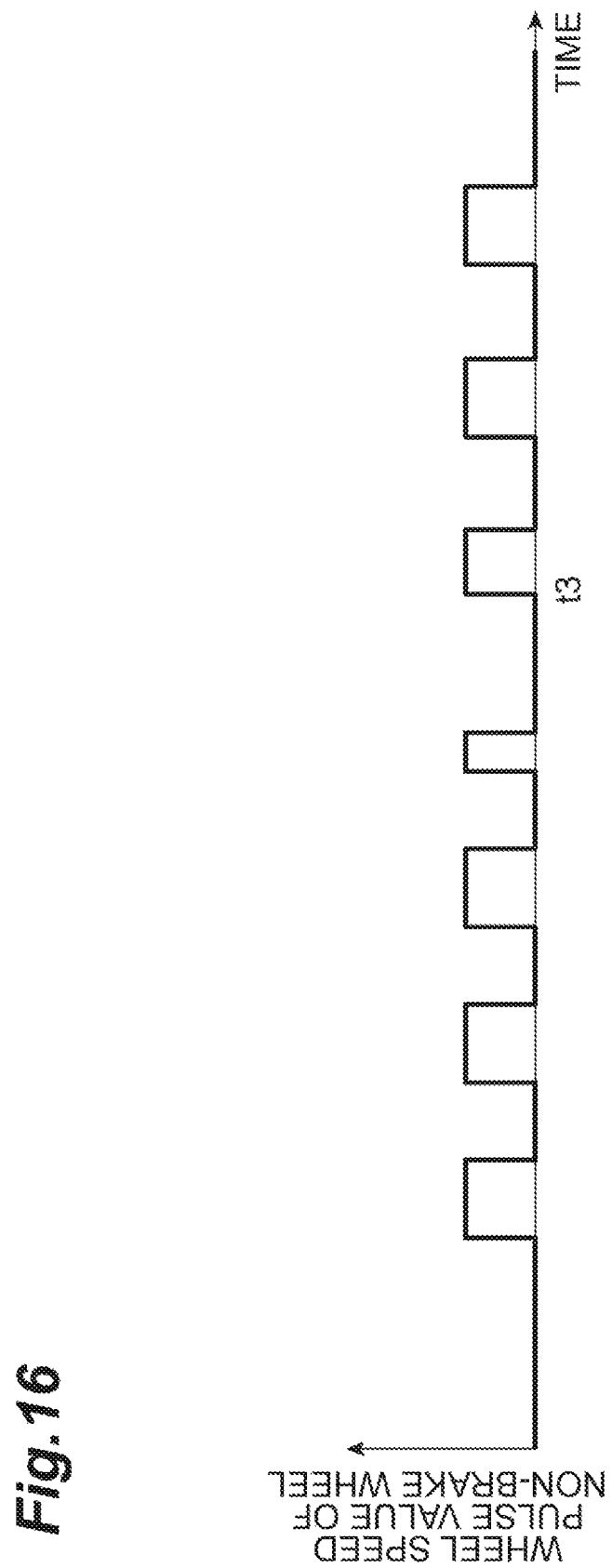
FIG. 16 is a detection result of the wheel speed pulse of the non-brake wheel when the wheel slips.

FIG. 15 is a graph showing a detection result of the wheel speed pulse of the brake wheel when the wheel slips, in time series. The vertical axis indicates the wheel speed pulse value, and the horizontal axis indicates a time. FIG. 16 is a graph showing the detection result of the wheel speed pulse of the non-brake wheel when the wheel slips, in time series. The vertical axis indicates the wheel speed pulse value, and the horizontal axis indicates a time. FIG. 17 is a graph showing the integrated value of the wheel speed pulse of the brake wheel and the integrated value of the wheel speed pulse of the non-brake wheel, in time series. The integrated value of the wheel speed pulse means an integrated value of pulse signals. The vertical axis indicates the integrated value of the wheel speed pulse, and the horizontal axis indicates a time. FIGS. 15 to 17 correspond to one another by the same time axes.

As shown in FIG. 15, when the brake wheel slips from a time t3, since the wheel slips, many wheel pulses are detected. On the other hand, as shown in FIG. 16, the non-brake wheel is correctly rotated according to the movement of the vehicle 2 even after the time t3, and the wheel speed pulse is detected. The lock and slip determination unit 14B determines whether or not the brake wheel slips based on the difference between the wheel speed pulse of the brake wheel and the wheel speed pulse of the non-brake wheel. Specifically, as shown in FIG. 17, the lock and slip determination unit 14B may determine whether or not the brake wheel slips based on the difference d between the integrated value of the wheel speed pulse of the brake wheel and the integrated value of the wheel speed pulse of the non-brake wheel. The lock and slip determination unit 14B outputs the determination result to the braking force and driving force applying unit 13B. In the case of the determination result in which the brake wheel slips, the braking force and driving force applying unit 13B decreases the driving force with respect to the brake wheel, and may perform the control which releases the slip state of the brake wheel. Alternatively, the lock and slip determination unit 14B calculates the correction amount of the driving force required for the control to release the slip state, and may output the correction amount to the braking force and driving force applying unit 13B. The braking force and driving force applying unit 13B may correct the braking force based on the correction amount.

As above, according to the vehicle control apparatus 1B performing the vehicle travel control, it is possible to determine not only the lock state of the brake wheel but also the slip state in which the brake wheel slips. In addition, for example, even when the brake control is performed during a traffic jam in which the speed of the vehicle is relatively low, it is possible to perform appropriate braking.

Moreover, in the embodiments, the examples in which the number of the wheels of the vehicle 2 is 4 are described. However, the number of the wheels is not limited to 4. For example, in the first embodiment, the third embodiment, and the fourth embodiment, the number of the wheels may be 2 or more. Moreover, in the second embodiment, the number of the wheels may be 3 or more.

The embodiments may be performed to be combined. For example, the control in the second embodiment may be applied to the third embodiment or the vehicle travel control performing the slip determination.

In the embodiments, the examples in which the wheel speed sensors are provided on all wheels are described. However, the wheel speed sensor may not be provided on the wheel which is not used in the control of the parking assistance or the travel assistance.

In the first embodiment, the wheel setting unit 11 may perform the wheel setting processing before the control shown in FIG. 5 is performed. Alternatively, for example, the wheel setting unit 11 may perform the wheel setting processing between the processing of S12 and the processing of S18. FIGS. 6 and 11 are also similarly applied.

In the first embodiment, the lock determination unit 14 may perform the wheel lock determination processing of S34 of FIG. 6 between S36 and S38. FIG. 11 is also similarly applied.

What is claimed is:

1. A vehicle control apparatus which performs a parking control of a vehicle, comprising:
   a wheel setting unit configured to determine at least one wheel to be a brake wheel to be applied with a braking force during the parking control and at least one wheel to be a non-brake wheel not to be applied with the braking force during the parking control; and
   a control unit configured to perform the parking control of the vehicle based on a rotation amount of the at least one brake wheel and a rotation amount of the at least one non-brake wheel, wherein the rotation amount of the at least one brake wheel and the rotation amount of the at least one non-brake wheel are detected by respective wheel speed sensors.

2. The vehicle control apparatus according to claim 1, wherein the control unit estimates a moving state amount of the vehicle based on the rotation amount of the at least one non-brake wheel, and controls the at least one brake wheel using the moving state amount of the vehicle.

3. The vehicle control apparatus according to claim 2, wherein the moving state amount of the vehicle is a movement distance, a speed, an acceleration, or a differential value of the acceleration of the vehicle.

4. The vehicle control apparatus according to claim 3, wherein the control unit decides whether or not the at least one brake wheel becomes locked based on a difference between the rotation amount of the at least one brake wheel and the rotation amount of the at least one non-brake wheel.

5. The vehicle control apparatus according to claim 4, wherein when the at least one brake wheel becomes locked, the wheel setting unit re-determines the at least one non-brake wheel to be a brake wheel.

6. The vehicle control apparatus according to claim 4, wherein the wheel setting unit determines at least two wheels to be non-brake wheels which results in two non-brake wheels,
wherein the control unit decides whether or not the at least one brake wheel becomes locked based on the difference between the rotation amount of the at least one brake wheel and the rotation amount of at least one of the two non-brake wheels, and
wherein when the brake wheel becomes locked, the wheel setting unit re-determines the at least one of the two non-brake wheels to be the brake wheel.

7. The vehicle control apparatus according to claim 3, wherein when the at least one brake wheel becomes locked, the wheel setting unit re-determines the at least one non-brake wheel to be a brake wheel.

8. The vehicle control apparatus according to claim 2, wherein the control unit decides whether or not the at least one brake wheel becomes locked based on a difference between the rotation amount of the at least one brake wheel and the rotation amount of the at least one non-brake wheel.

9. The vehicle control apparatus according to claim 8, wherein when the at least one brake wheel becomes locked, the wheel setting unit re-determines the at least one non-brake wheel to be a brake wheel.

10. The vehicle control apparatus according to claim 8, wherein the wheel setting unit determines at least two wheels to be non-brake wheels which results in two non-brake wheels,
wherein the control unit decides whether or not the at least one brake wheel becomes locked based on the difference between the rotation amount of the at least one brake wheel and the rotation amount of at least one of the two non-brake wheels, and
wherein when the brake wheel becomes locked, the wheel setting unit re-determines the at least one of the two non-brake wheels to be the brake wheel.

11. The vehicle control apparatus according to claim 2, wherein when the at least one brake wheel becomes locked, the wheel setting unit re-determines the at least one non-brake wheel to be a brake wheel.

12. The vehicle control apparatus according to claim 1, wherein the control unit decides whether or not the at least one brake wheel becomes locked based on a difference between the rotation amount of the at least one brake wheel and the rotation amount of the at least one non-brake wheel.

13. The vehicle control apparatus according to claim 12, wherein when the at least one brake wheel becomes locked, the wheel setting unit re-determines the at least one non-brake wheel to be a brake wheel.

14. The vehicle control apparatus according to claim 12, wherein the wheel setting unit determines at least two wheels to be non-brake wheels which results in two non-brake wheels,
wherein the control unit decides whether or not the at least one brake wheel becomes locked based on the difference between the rotation amount of the at least one brake wheel and the rotation amount of at least one of the two non-brake wheels, and
wherein when the brake wheel becomes locked, the wheel setting unit re-determines the at least one of the two non-brake wheels to be the brake wheel.

15. The vehicle control apparatus according to claim 1, wherein when the at least one brake wheel becomes locked, the wheel setting unit re-determines the at least one non-brake wheel to be a brake wheel.

16. The vehicle control apparatus according to claim 15, wherein when the at least one brake wheel becomes locked, the control unit causes a brake actuator to decrease a braking force with respect to the at least one brake wheel that became locked, and causes the brake actuator to apply the braking force to the at least one brake wheel that was re-determined to be the brake wheel.

17. The vehicle control apparatus according to claim 16, wherein the control unit causes the brake actuator to apply the braking force to the at least one brake Wheel that was re-determined to be the brake wheel at a force corresponding to the braking force decreased with respect to the at least one brake wheel that became locked.

18. The vehicle control apparatus according to claims 1, wherein the non-brake wheel is a wheel to which the braking force and a driving force are not applied during the parking control.

19. A vehicle control method performing a parking control of a vehicle, comprising:
determining at least one wheel to be a brake wheel to be applied with a braking force during the parking control and at least one wheel to be a non-brake wheel not to be applied with the braking force during the parking control;
detecting a rotation amount of the at least one brake wheel and a rotation amount of the at least one non-brake wheel, wherein the rotation amount of the at least one brake wheel and the rotation amount of the at least one non-brake wheel are detected by respective wheel speed sensors;
deciding whether or not the at least one brake wheel becomes locked based on the rotation amount of the at least one brake wheel and the rotation amount of the at least one non-brake wheel detected in the step of detecting; and
applying a predetermined braking force to the at least one brake wheel when it is decided that the at least one brake wheel did not become locked in the step of determining and applying a braking force smaller than the predetermined braking force to the at least one brake wheel when it is determined that the at least one brake wheel becomes locked in the step of determining.

* * * * *